(12) United States Patent
Ding

(10) Patent No.: US 7,924,046 B1
(45) Date of Patent: Apr. 12, 2011

(54) CONFIGURABLE EMPHASIS FOR HIGH-SPEED TRANSMITTER DRIVER CIRCUITRY

(75) Inventor: Weiqi Ding, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 12/776,871

(22) Filed: May 10, 2010

(51) Int. Cl.
*H03K 17/16* (2006.01)

(52) U.S. Cl. .......................................... 326/26; 326/87

(58) Field of Classification Search .................. 326/21, 326/26–28, 82–87
See application file for complete search history.

(56) References Cited

U.S. PATENT DOCUMENTS

| | | | |
|---|---|---|---|
| 7,557,615 B1 * | 7/2009 | Tran et al. | 326/82 |
| 7,583,753 B2 * | 9/2009 | Okamura | 375/296 |
| 2004/0124888 A1 * | 7/2004 | Radelinow | 327/65 |
| 2006/0006901 A1 * | 1/2006 | Groen et al. | 326/27 |

* cited by examiner

*Primary Examiner* — Don P Le
(74) *Attorney, Agent, or Firm* — Ropes & Gray LLP

(57) ABSTRACT

Pre-emphasis may be able to operate in either of two modes. In a first mode, when one bit has a same value as the bit that immediately preceded it, an output signal for said one bit is based on a first electrical current reduced by a second electrical current. Otherwise the output signal for said one bit is based on the first current without regard for the second current. The second mode may be similar to the first mode when said one bit has the same value as the immediately preceding bit; but otherwise the output signal for said one bit is based on the first current increased by the second current. As an alternative to using the immediately preceding bit (as in the above "post-tap" operation), the immediately succeeding (following) bit may be used in generally the same way (in so-called "pre-tap" operation).

30 Claims, 16 Drawing Sheets

| D0 & D1 | Closed Switches | Open Switches | Vout (i.e., Vop - Von) | Post-tap Contributing to Vout ? |
|---|---|---|---|---|
| 11 | S1, Sp1, Sp2 | S0, Sp0, Sp3 | (I-Ip)R | Yes |
| 01 | S0, Sp1, Sp2 | S1, Sp0, Sp3 | -(I+Ip)R | Yes |
| 00 | S0, Sp0, Sp3 | S1, Sp1, Sp2 | -(I-Ip)R | Yes |
| 10 | S1, Sp0, Sp3 | S0, Sp1, Sp2 | (I+Ip)R | Yes |
| 11 | All Same as First Line | | | |

FIG. 16

CONFIGURABLE EMPHASIS FOR HIGH-SPEED TRANSMITTER DRIVER CIRCUITRY

BACKGROUND

This disclosure relates to circuitry for use in transmitting a digital (e.g., binary) signal from one circuit or system component to another. A typical (but not necessarily the only) application of this disclosure is in circuitry for transmitting a high-speed serial data signal from one integrated circuit ("IC") on a printed circuit board ("PCB") to another IC on that PCB or to another IC on another PCB that is connected to the first PCB via a so-called back-plane ("BP") circuit structure. Because some aspects of the disclosure may relate to circuitry that is configurable (e.g., programmable) for use in a range of different applications, the circuitry of this disclosure may be provided on a general-purpose or relatively general-purpose IC such as a programmable logic device ("PLD"), a field-programmable gate array ("FPGA"), a programmable microcontroller, or the like.

A high-speed serial data signal (e.g., a serial data signal typically (but not necessarily) having a binary digit ("bit") rate in excess of 1 gigabits per second ("1 Gbps")) that needs to be transmitted by one circuit component (e.g., a first IC) to another circuit component (e.g., a second IC) is typically subject to some attenuation (loss, distortion) as it travels through the transmission medium from the transmitting (transmitter, "TX") component to the receiving (receiver, "RX") component. Such attenuation tends to be exponentially greater for the higher frequency components of the signal being transmitted. Attenuation makes it more difficult for the receiver component to accurately interpret (recover) the data from the signal it receives.

To reduce the adverse effects of the above-described signal transmission attenuation, it is known to give the high-speed serial data signal what is sometimes called pre-emphasis just prior to transmitting the signal. For example, such pre-emphasis may give each data bit in the signal that has binary data value (e.g., binary 1 or binary 0) different from the immediately preceding bit some extra energy (e.g., greater voltage) in the high-speed serial data signal as that signal emanates from the transmitter. The high-speed serial data signal needs its highest frequency components to convey such changes in binary value; and because these frequency components are subject to the greatest transmission loss (attenuation), giving these binary value changes extra energy helps to compensate (in advance) for the transmission loss they are especially vulnerable to. The signal therefore arrives at the receiver in better condition, and the receiver is consequently better able to accurately recover the data contained in that signal.

Typically, if transmitter circuitry is able to operate at any one of several bit rates over a range of possible bit rates (e.g., a bit rate (in such a range) that is selectable (configurable, programmable) by a user of the circuitry), only one type of pre-emphasis may be available for use regardless of the bit rate that is selected for use. That type of pre-emphasis may work well for bit rates up to a particular bit rate threshold. But it may not work as well for bit rates greater than that threshold.

SUMMARY

In accordance with certain possible aspects of the disclosure, circuitry for giving pre-emphasis to each bit in a serial data signal whose data value differs from a data value of an immediately preceding bit in the serial data signal may include first circuitry for causing a first electrical current to flow in a circuit element in a direction that is indicative of the data value of each succeeding bit. The circuitry may further include second circuitry, responsive to a condition in which one bit has a same data value as the bit that immediately preceded said one bit, for causing a second electrical current to flow in the circuit element in a direction opposite to the first current. The circuitry may still further include third circuitry for producing a serial data output signal based on an amount and direction of net current flow in the circuit element.

In accordance with certain other possible aspects of the disclosure, a method for giving pre-emphasis to each bit in a serial data signal whose data value differs from a data value of an immediately preceding bit in the serial data signal may include, when one bit has a different data value than the bit that immediately preceded said one bit, producing a serial data output signal bit corresponding to said one bit based on a first electrical current that is indicative of the data value of said one bit and that is produced without regard for the data value of said bit that immediately preceded said one bit. The method may further include, when said one bit has a same data value as said bit that immediately preceded said one bit, producing said serial data output signal bit corresponding to said one bit based on said first electrical current reduced by a second electrical current.

As an alternative to using the immediately preceding bit (as in the above "post-tap" operation), the immediately following (succeeding) bit may be used in a generally similar way (in so-called "pre-tap" operation).

Further features of the disclosure, its nature and various advantages, will be more apparent from the accompanying drawings and the following detailed description.

BRIEF DESCRIPTION OF THE DRAWINGS

FIG. 16 is a table illustrating various operating conditions of the FIG. 15 circuitry in accordance with certain possible aspects of the disclosure.

FIGS. 18a-c may sometimes be referred to collectively as FIG. 18.

DETAILED DESCRIPTION

Figure 1:
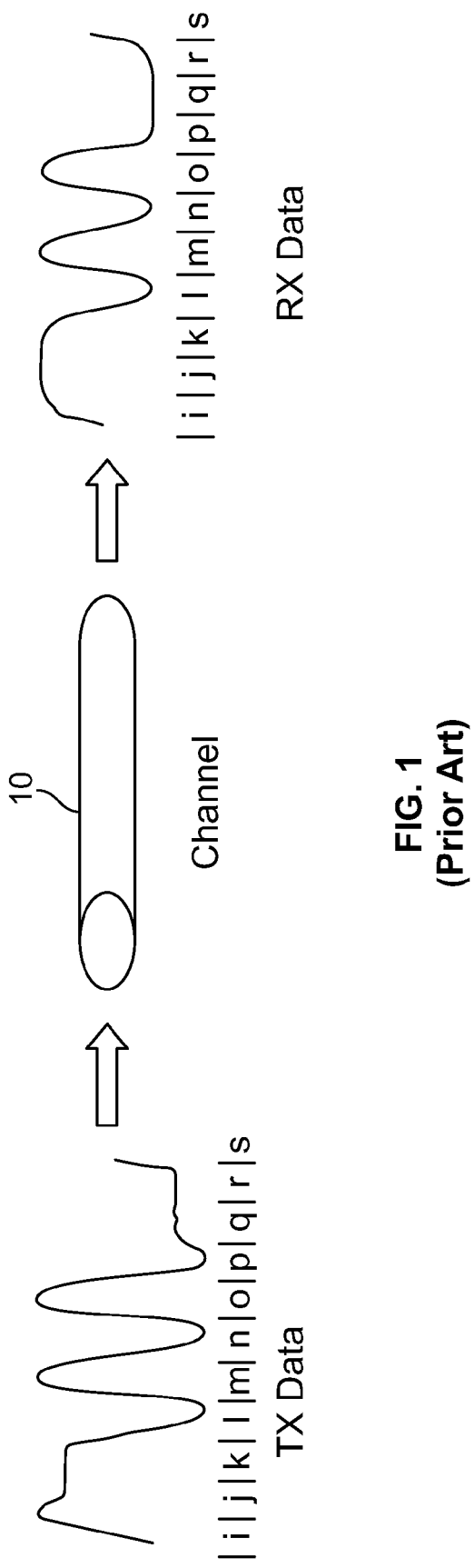
FIG. 1 is a simplified diagram of representative signal waveform portions before and after passing through a schematically depicted transmission medium between transmitter and receiver circuitry.

FIG. 1 shows (on the left) an example of a transmitter ("TX") high-speed serial data signal that has been given so-called pre-emphasis (TX equalization, pre-distortion). Each of the lettered intervals i-s represents one unit interval ("UI") in the TX data signal. A UI is the time duration of any one bit in the data signal. The bit in interval j comes (in time) immediately after the bit in interval i; the bit in interval k comes (in time) immediately after the bit in interval j; and so on. Another way to state this is that bit i is transmitted first; then bit j is transmitted; then bit k is transmitted; and so on. In each of the waveforms shown (on the left and on the right in FIG. 1) the vertical axis is signal voltage (with greater voltage being higher along the vertical axis), and the horizontal axis is time of transmission of that voltage (with later time of transmission being farther to the right along the horizontal axis).

Note that in the TX data waveform on the left, high-valued bit j (e.g., a bit having binary data value 1) immediately follows low-valued bit i (e.g., a bit having binary data value 0). In accordance with certain known TX equalization schemes, bit j is given pre-emphasis (e.g., somewhat higher voltage than another high-valued bit (such as bit k) that immediately follows an already high-valued bit). Similarly, low-valued bit l, which immediately follows high-valued bit k, is given pre-emphasis (e.g., somewhat lower voltage than another low-valued bit (such as bit q) that immediately follows an already low-valued bit). In other words, each bit in the TX data waveform that immediately follows a differently valued bit is given pre-emphasis relative to bits that immediately follow same-valued bits. Thus bits j, l, m, n, o, and p are given pre-emphasis. Bits k, q, and r are not given pre-emphasis.

The TX data waveform shown in FIG. 1 is, of course, produced by transmitter circuitry in a system. The transmitter circuitry gives the various bits of this signal the appropriate pre-emphasis as described above.

FIG. 1 shows the TX data waveform on the left passing through transmission channel circuitry 10 and emerging as the RX data waveform on the right. The RX data signal is what receiver circuitry in a system receives (sees). FIG. 1 shows that transmission channel 10 causes attenuation of the signal it transmits (compare the RX data waveform to the original TX data waveform). For example, the overall voltage swing (difference between highest and lowest voltages) of the RX data signal is less than the overall voltage swing of the TX data signal; and it is especially to be noted that bits that immediately follow differently valued bits no longer show (in the RX data) the extra emphasis that they were given in the TX data. However, without that extra starting emphasis ("pre-emphasis"), these bits would be even less distinct in the RX data. The TX pre-emphasis has therefore helped to make it easier for the receiver circuitry to accurately recover all the data from the signal it receives.

In summary, a purpose of TX equalization as illustrated by FIG. 1 is to pre-distort the TX data signal to compensate for downstream transmission channel loss (e.g., in transmission channel 10). Such TX equalization is also called pre-emphasis. Pre-emphasis tends to reduce the amplitude of the lower frequency components in the data signal relative to peaking the higher frequency components in that signal. A typical way to accomplish this is by using TX output signal driver circuitry that includes one so-called pre-cursor tap or one so-called post-cursor tap (examples of such driver circuitry being shown and described later in this specification).

A consequence of such pre-emphasis is that the data signal at the receiver has more balanced high and low frequency components. This helps to reduce inter-symbol interference ("ISI") effects. (ISI makes it harder for the receiver circuitry to accurately distinguish a bit from the immediately preceding and/or following bit.) More balanced high and low frequency components in the received signal also give that signal a wider eye opening. (The "eye" of a data signal can be plotted by superimposing on one unit interval the trace of multiple bits in the data signal. The eye of the signal is the area in such a plot through which no part of the trace of any of these bits passes. The larger this "open" area or eye (e.g., in terms of height and width) the easier it tends to be for receiver circuitry to accurately recover all data bits from the signal.)

Figure 2:
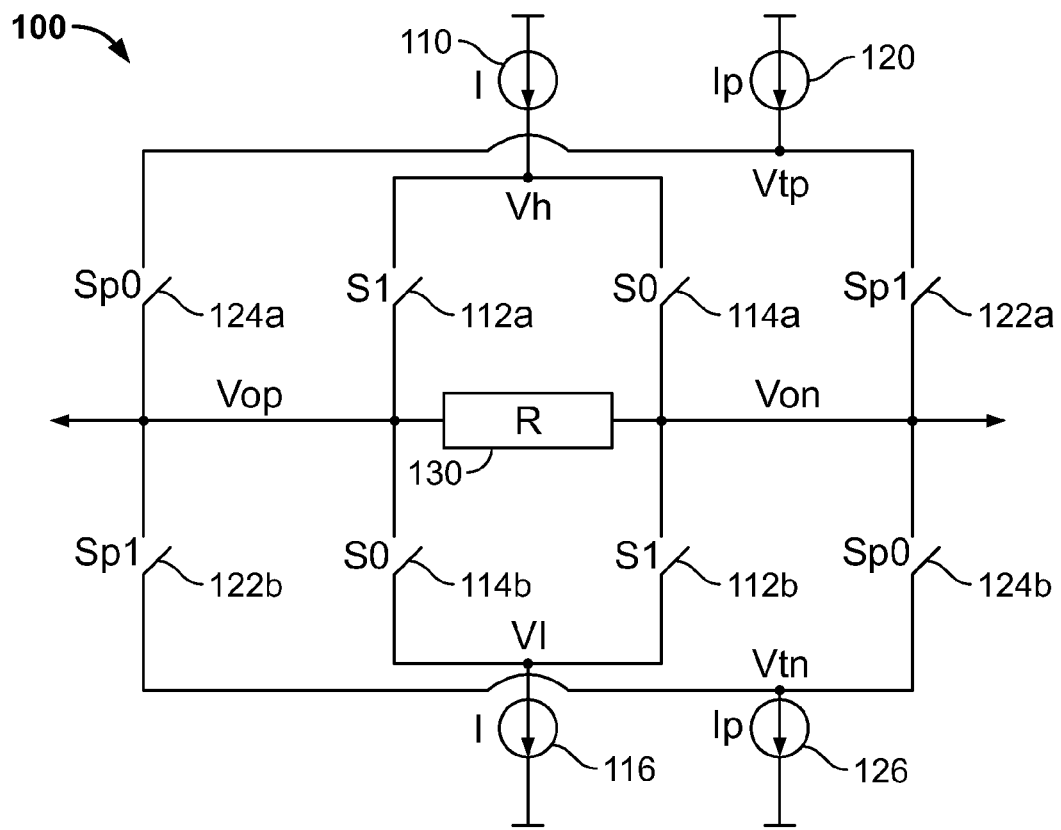
FIG. 2 is a simplified schematic block diagram of illustrative known driver circuitry.

FIG. 2 shows an illustrative example of known TX driver circuitry 100 that may be used to give a transmitted high-speed data signal pre-emphasis of the type shown on the left in FIG. 1. Circuitry 100 is of a type that may be referred to as H-bridge or H-tree based TX driver circuitry. Circuitry 100 includes so-called main tap circuit elements 110, 112a, 112b, 114a 114b, and 116. Circuitry 100 also includes so-called post-tap circuit elements 120, 122a, 122b, 124a, 124b, and 126. A further element of circuitry 100 is resistor 130.

(Although circuit elements 120, 122a, 122b, 124a, 124b, and 126 are referred to above and in many subsequent instances as "post-tap" circuit elements or the like, it will be understood that these or similar elements can alternatively be "pre-tap" circuit elements. To avoid unduly complicating this discussion, it will generally be assumed until much later that the circuitry makes use of post-tap operation. However, after the post-tap option has been fully discussed, the pre-tap alternative will also be given thorough consideration.)

Considering first the main tap circuit elements: Element 110 is current source circuitry that supplies an amount of electrical current I to a node that is labelled Vh. Element 116 is current sink circuitry that drains an amount of electrical current I from a node that is labelled Vl. (Although perhaps most accurately described a current sink circuitry, elements like 116 may sometimes be referred to as current source circuitry just to simplify and generalize the discussion.) Element 112a is controllably closable and openable electrical switch circuitry (e.g., a transistor switch) that is connected across (between) node Vh and a first output node Vop of circuitry 100. Element 114a is another switch element like 112a that is connected between (across) node Vh and a second output node Von. Elements 112b and 114b are other switch elements like 112a. Switch 112b is connected between nodes Von and Vl. Switch 114b is connected between nodes Vop and Vl.

Turning now to the post-tap circuitry: Element 120 is current source circuitry that supplies an amount of electrical current Ip to node Vtp. Element 126 is current sink (or source) circuitry that draws an amount of electrical current Ip from node Vtn. Elements 122a, 122b, 124a, and 124b are all switch elements like above-described element 112a. Switch 122a is connected between nodes Vtp and Von; switch 122b is connected between nodes Vop and Vtn; switch 124a is connected between nodes Vtp and Vop; and switch 124b is connected between nodes Von and Vtn.

Resistor 130 is connected between nodes Vop and Von. Nodes Vop and Von provide complementary constituents of the TX data signal output by TX driver circuitry 100. In other words the output signal of circuitry 100 is actually two complementary signals Vop and Von. These signals are complementary because when either of these signals has its relatively high voltage, the other signal has its relatively low voltage. Such complementary or differential signalling is well known to those skilled in the art as an alternative to so-called single-ended signalling (only one signal rather than two complementary signals), and so it will generally not be necessary herein to specifically distinguish whether complementary or single-ended signals, signalling, or circuitry is being referred to or employed in any particular embodiment. Also, it will not be generally necessary to separately refer to the two complementary signal constituents that are present when complementary signalling is being used. Instead, both of such complementary constituents may simply be referred to collectively as a single signal.

Note that switches 112, 114, 122, and 124 in FIG. 2 may alternatively be referred to as switches S1, S0, Sp1, and Sp0 in accordance with the following correlation: 112a and 112b=S1; 114a and 114b=S0; 122a and 122b=Sp1; and 124a and 124b=Sp0. This is done because the indicated pairs of switches (e.g., pair 112a and 112b) are controlled in tandem (i.e., in the same way at the same time) in circuitry 100. It is therefore more convenient to have a simplified reference (e.g., S1) for both switches in each such pair.

Figure 3:
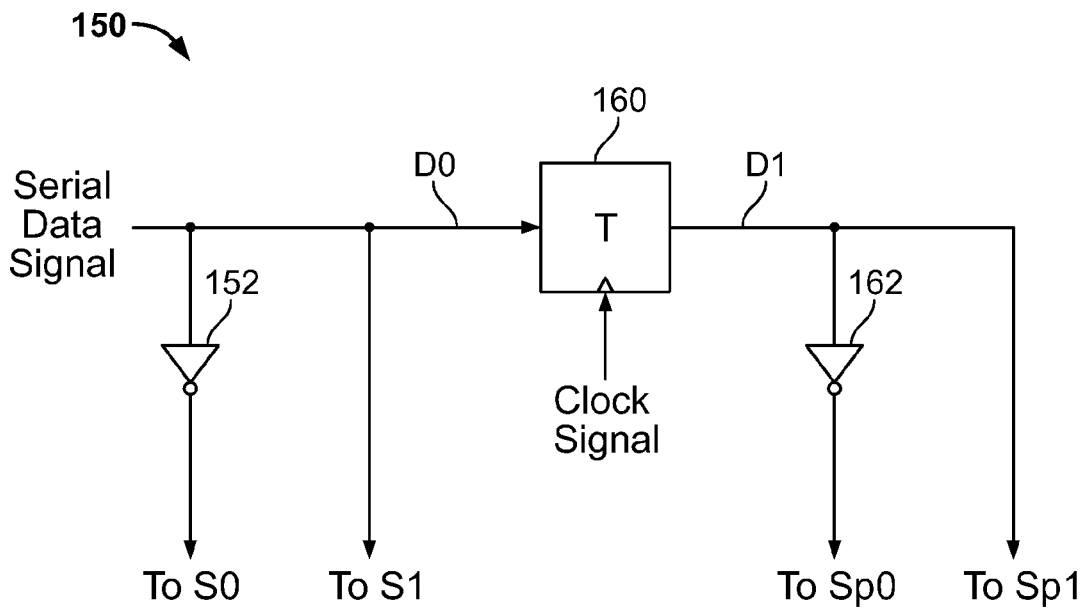
FIG. 3 is a simplified schematic block diagram of illustrative known circuitry that can be used for controlling the FIG. 2 circuitry.

An illustrative known construction of circuitry 150 for controlling the switches in FIG. 2 is shown in FIG. 3. The serial data signal to be transmitted is applied to this circuitry as shown. In any given UI the bit represented by this signal may be designated D0 as shown. This signal is applied to delay circuit element 160, which delays the applied signal by an amount of time T equal to the duration of one UI. For this purpose, delay circuit element 160 may be clocked by a clock signal having a frequency equal to the bit rate of the serial data signal. Thus during each UI, delay element 160 outputs the data bit it received during the immediately preceding UI. In any given UI the bit output by delay element 160 may be referred to as D1. Again, each instance of D1 is equal to the instance of D0 in the immediately preceding UI. Referring back to FIG. 1, if D1 is currently representing bit j, for example, then D0 is concurrently (at the same time) representing bit k. As another similar example, if D1 is currently representing bit k, then D0 is concurrently representing bit l.

FIG. 3 shows that D0 is used to control switches S1 in FIG. 2. For example, when D0 is binary 1, this may close both of switches S1; and conversely, when D0 is binary 0, this may open both of switches S1. (The logic could be reversed (i.e., D0=1 could cause switches S1 to open; but binary 1 closing a switch is suitable as an illustrative example that will be assumed for all of the switches in all of the illustrative embodiments shown and described herein.) FIG. 3 further shows that D0 is logically inverted by inverter circuitry 152. The output signal of inverter 152 is used to control switches S0 in FIG. 2. This means that whenever switches S1 are closed, switches S0 are open; and whenever switches S1 are open, switches S0 are closed.

Turning now to the output signal (D1) of delay element 160, FIG. 3 shows that D1 is used to control switches Sp1 in FIG. 2. Again, the logic is the same, i.e., a binary 1 value of D1 closes switches Sp1, and a binary 0 value of D1 opens switches Sp1. D1 is also inverted by inverter circuitry 162, and the output signal of this inverter controls switches Sp0 in FIG. 2. Thus, whenever switches Sp1 are closed by the value of D1, that inverted D1 value opens switches Sp0. Conversely, whenever switches Sp1 are open, switches Sp0 are closed.

Operation of the circuitry shown in FIGS. 2 and 3 may be characterized as governed by the following relationship:

$$Y[n]=C0*X[n]+C1*X[n-1],$$

where X[n] is the current input bit, X[n−1] is the preceding input bit, and Y[n] is the current output bit. The transfer function can also be expressed in the z-domain as $$H(z)=Y(z)/X(z)=C0+C1*z^{-1},$$

where H(z) represents a high-pass filter in the frequency domain. The filter attenuates the signal energy in the low frequency components of the input signal. C0 and C1 are controlled by I and Ip, respectively. C1 has to have a different sign from C0 (i.e., is negative) to make a high-pass filter (due to the relative connectivity of the various switches in the main and post-tap portions of circuitry 100, and how the true and complement forms of D0 and D1 are applied to control those various switches). $z^{-1}$ refers to the UI delay in the z-domain. Note that I is normally greater than 2 times Ip.

Figure 4:
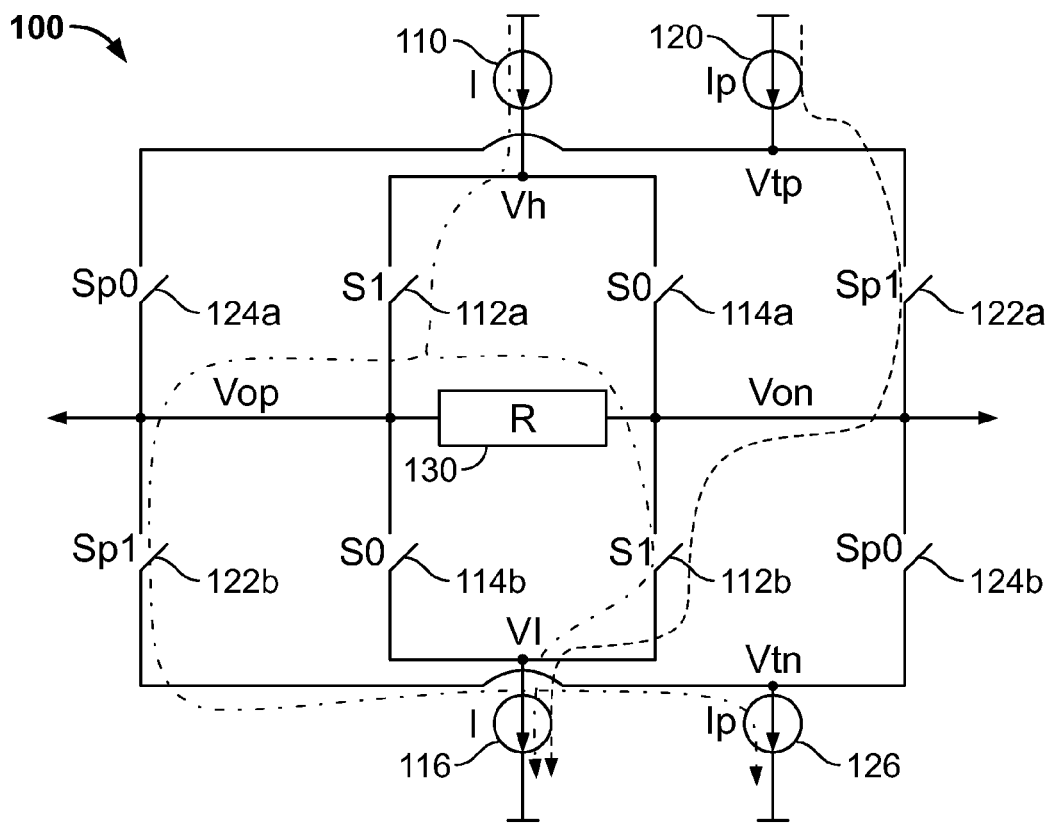
FIG. 4 shows a particular operating condition of the FIG. 2 circuitry.

FIG. 4 is a repetition of FIG. 2, but augmented with lines showing current flows that exist in the circuitry during a particular operating condition of the circuitry. This operating condition corresponds to D0 and D1 both being equal to binary 1. This state of the data closes switches S1 and Sp1; and it opens switches S0 and Sp0. (In FIG. 4 and subsequent similar FIGS., the switches that are closed are not drawn any differently from the switches that are open; but the fact that electrical current is shown flowing through the closed switches is a sufficient graphical indication that those switches are closed.) The current I from source 110 can be traced to ground (at the bottom ends of current sinks 116 and 126) by following the chain-dashed line, which starts by passing through source 110. Similarly, the current Ip from source 120 can be traced to ground by following the simple dashed (i.e., not chain-dashed) line, which starts by passing through source 120. By tracing these various current flows, it can be seen that the following relationship applies to this operating condition of circuitry 100:

$$Vout=Vop-Von=(I-Ip)R,$$

where R is the resistance of resistor 130. Note that Vout is a convenient way to combine complementary data output signals Vop and Von into one signal value that is directly comparable to the single TX data signal waveform shown on the left in FIG. 1. Note also that in this operating condition Vtp is approximately equal to Vl, and Vtn is approximately equal to Vh.

Figure 5:
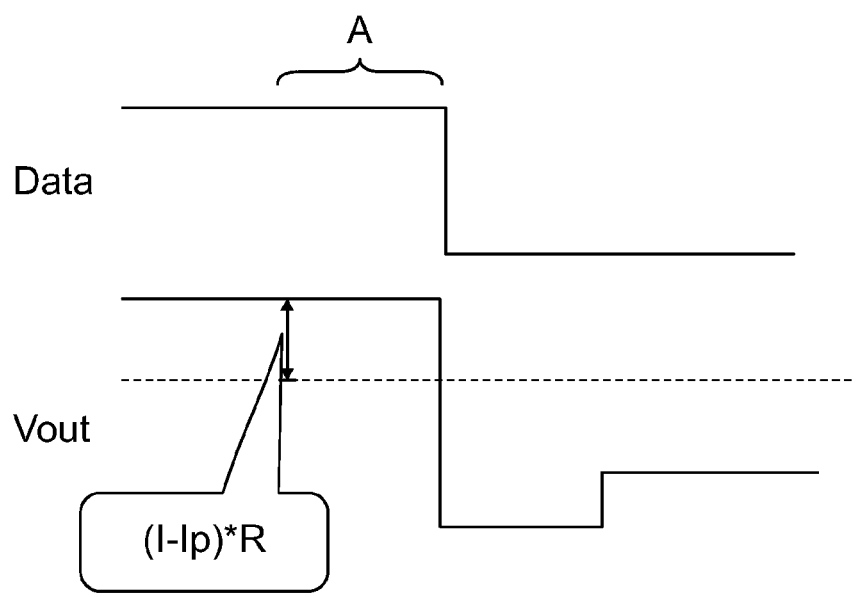
FIG. 5 shows simplified signal waveforms that include features associated with the operating condition shown in FIG. 4.

Region A in FIG. 5 shows how the kind of data condition described above in connection with FIG. 4 causes Vout to have the "basic value," "basic voltage level," or "basic level" (I−Ip)*R. By "basic level" it is meant that in region A Vout does not possess any extra emphasis (pre-emphasis). (The horizontal dashed line in FIG. 5 (and subsequent similar FIGS.) may correspond to any convenient reference voltage level (e.g., the common mode voltage of a differential or complementary form of the TX data output signal). The common mode voltage of a differential or complementary signal is the voltage that is midway between the two complementary constituents of such a differential or complementary signal. Such a common mode voltage may have any voltage value; but for convenience herein it will generally be assumed that the dashed line reference voltage in FIG. 5 and subsequent similar FIGS. is 0 volts.) Continuing with the discussion of Vout in region A in FIG. 5 having the "basic voltage level," it will be seen that in region A the magnitude (absolute value) of the voltage difference between Vout and the dashed line reference voltage is not as great as it is just after Vout drops below the reference voltage (to the right of region A in FIG. 5). As will be discussed in more detail in the next paragraphs, that greater magnitude of voltage difference (immediately after the drop below the dashed line reference voltage) is a region of extra emphasis or pre-emphasis. Where Vout does not have such pre-emphasis (e.g., in region A), Vout may be said to be at its "basic level." Another term that may be used for this basic level of Vout may be "de-emphasis level" or "de-emphasis."

Figure 6:
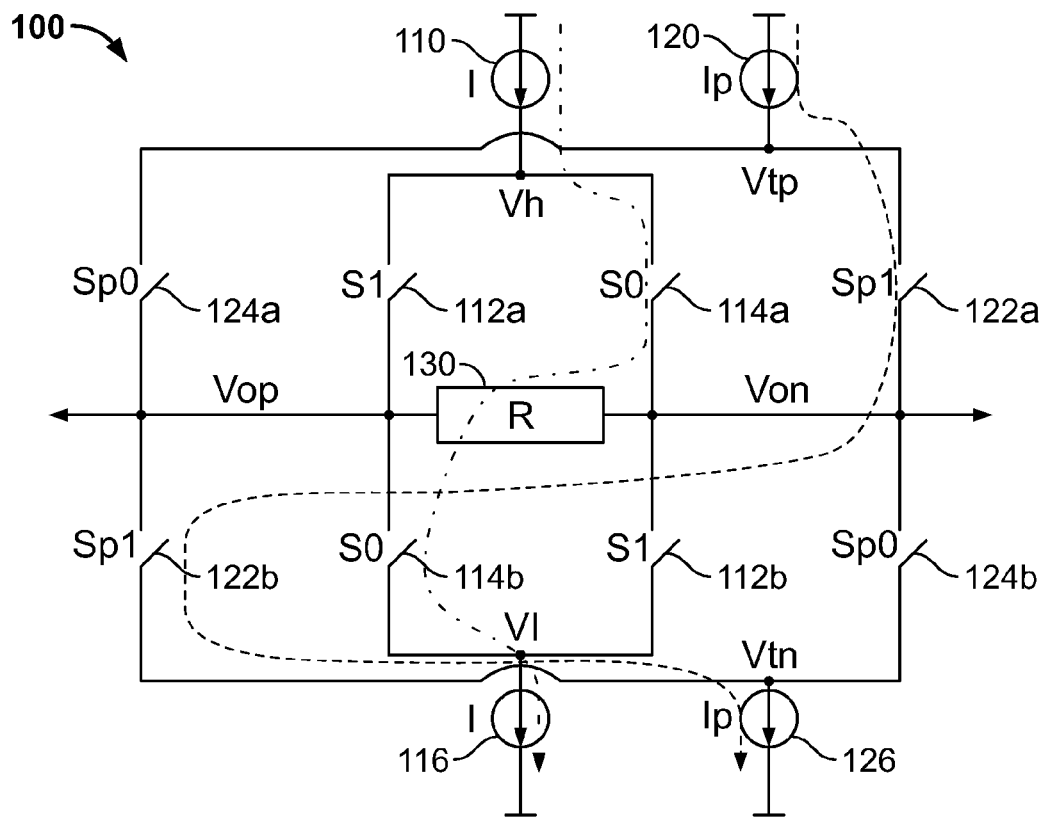
FIG. 6 shows another particular operating condition of the FIG. 2 circuitry.

FIG. 6 repeats FIG. 4, but shows how circuitry 100 operates when D0=0 and D1=1. This state of the data closes switches S0 and Sp1; and it opens switches S1 and Sp0. It also corresponds to region B in FIG. 7 (similar to above-described FIG. 5). By tracing the various current flows from element 110 to ground (chain-dashed line) and from element 120 to ground (simple dashed line), it can be seen that the following relationship applies to this operating condition of circuitry 100:

$$Vout = Vop - Von = -1*(I+Ip)R.$$

It will also be noted that in this operating condition Vtp is approximately equal to Vh, and Vtn is approximately equal to Vl.

Figure 7:
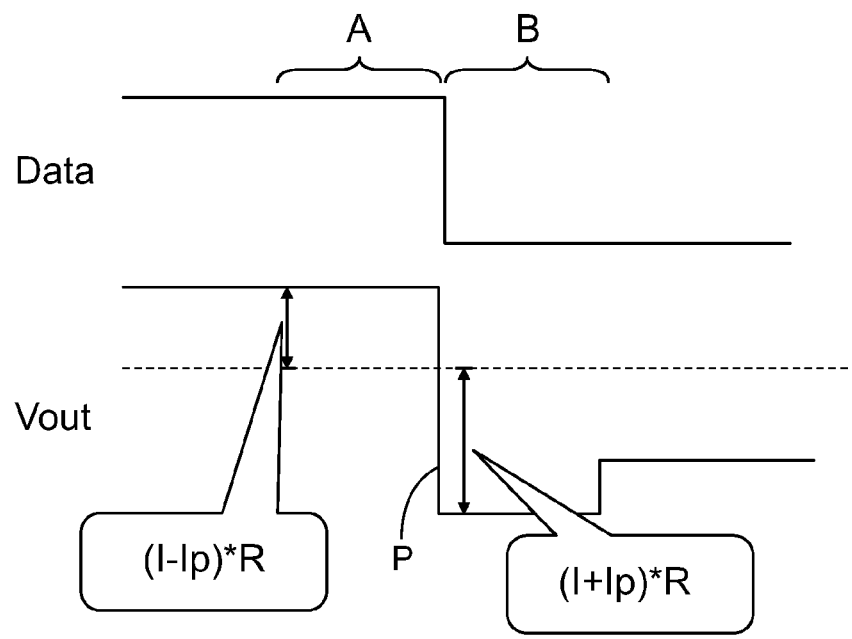
FIG. 7 repeats what is shown in FIG. 5 with additional identification of features associated with the operating condition shown in FIG. 6.

Region B in FIG. 7 shows how the kind of data condition described above for FIG. 6 causes Vout to have the "emphasized value," "emphasized voltage level," "emphasized level," "pre-emphasis level," or "pre-emphasis" $-(I+Ip)*R$. By "emphasized level" it is meant that in region B (to the right of transition P) Vout has extra emphasis (pre-emphasis). A measure of the magnitude of this pre-emphasis is given by the difference between the absolute values of Vout (relative to the dashed line reference voltage) in regions A and B. This difference in absolute values relative to reference is 2 times Ip.

FIG. 8 again repeats FIGS. 2 and 4, but shows how circuitry 100 operates when D0=0 and D1=1. This state of the data closes switches S0 and Sp1; and it opens switches S1 and Sp0. It also corresponds to region C in FIG. 9 (similar to above-described FIGS. 5 and 7). By tracing the various current flows from element 110 to ground (chain-dashed line) and from element 120 to ground (simple dashed line), it can be seen that the following relationship applies to this operating condition of circuitry 100:

$$Vout = Vop - Von = -1*(I-Ip)R.$$

It will also be noted that in this operating condition Vtp is approximately equal to Vh, and Vtn is approximately equal to Vl.

Figure 8:
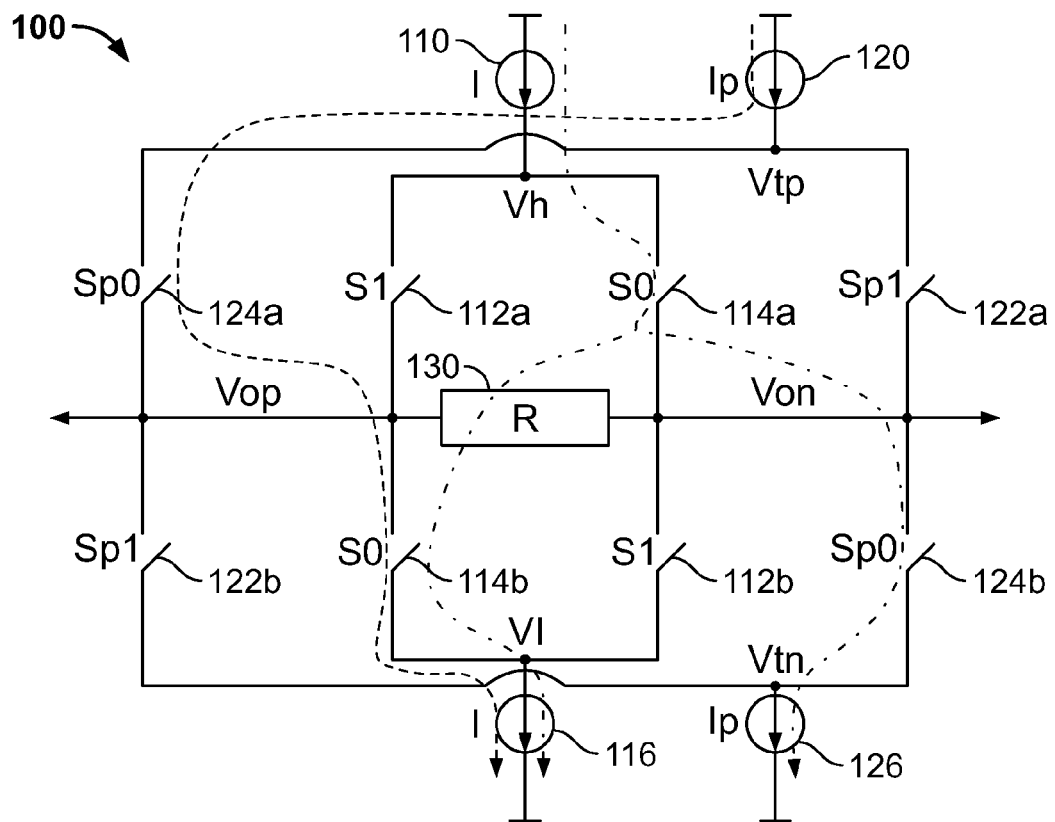
FIG. 8 shows yet another particular operating condition of the FIG. 2 circuitry.
Figure 9:
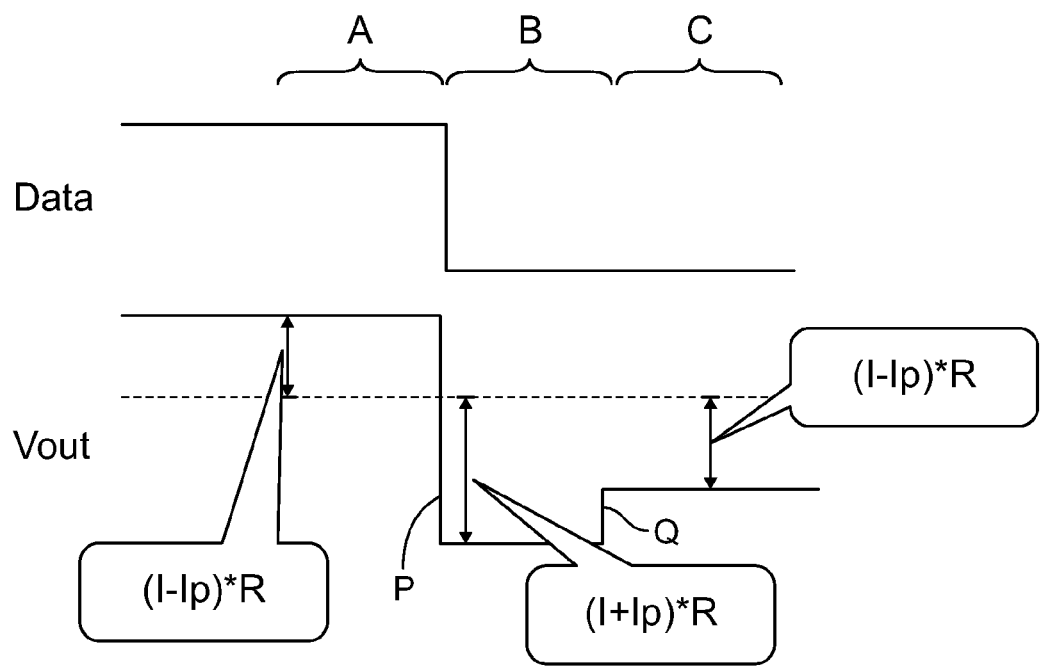
FIG. 9 repeats what is shown in FIG. 7 with additional identification of features associated with the operating condition shown in FIG. 8.

Region C in FIG. 9 shows how the kind of data condition described above for FIG. 8 causes Vout to shift to the basic value $-(I+Ip)*R$. Again, by basic value it is meant that in region C (as in region A) Vout does not possess any extra emphasis (pre-emphasis) (as it did in region B).

Although not shown in any FIGS. Like FIGS. 4-9, those skilled in the art will appreciate that there is yet another operating condition of circuitry 100, namely, the condition in which D0=1 and D1=0. From what has been shown and described, those skilled in the art will appreciate that in this operating condition switches S1 and Sp0 are closed, and switches S0 and Sp1 are open. Those skilled in the art will understand that this condition causes Vout to be equal to $(I+Ip)*R$ (i.e., to have a value in any FIG. like FIGS. 5, 7, and 9 that is above the horizontal dashed line by an amount equal to $(I+Ip)*R$). This is again a condition of Vout that exhibits the effect of pre-emphasis.

Some additional characteristics (or characterizations) of the above known circuitry and pre-emphasis are as follows: In this circuitry the TX output voltage swing (maximum voltage excursion) is given by the following relationship:

$$VOD = 2*(I+Ip)*R.$$

The TX equalization ratio is given by the following relationship:

$$REQ = 2*[(I+Ip)R - (I-Ip)R]/VOD$$
$$= 2*Ip/(I+Ip)$$

The total driver current is given by the following relationship.

$$Itotal = I+Ip.$$

An advantage of this known architecture is that it is the most power-efficient architecture for a given REQ. However, the present disclosure deals with limitations of this architecture that will be described in the next paragraphs.

Figure 10:
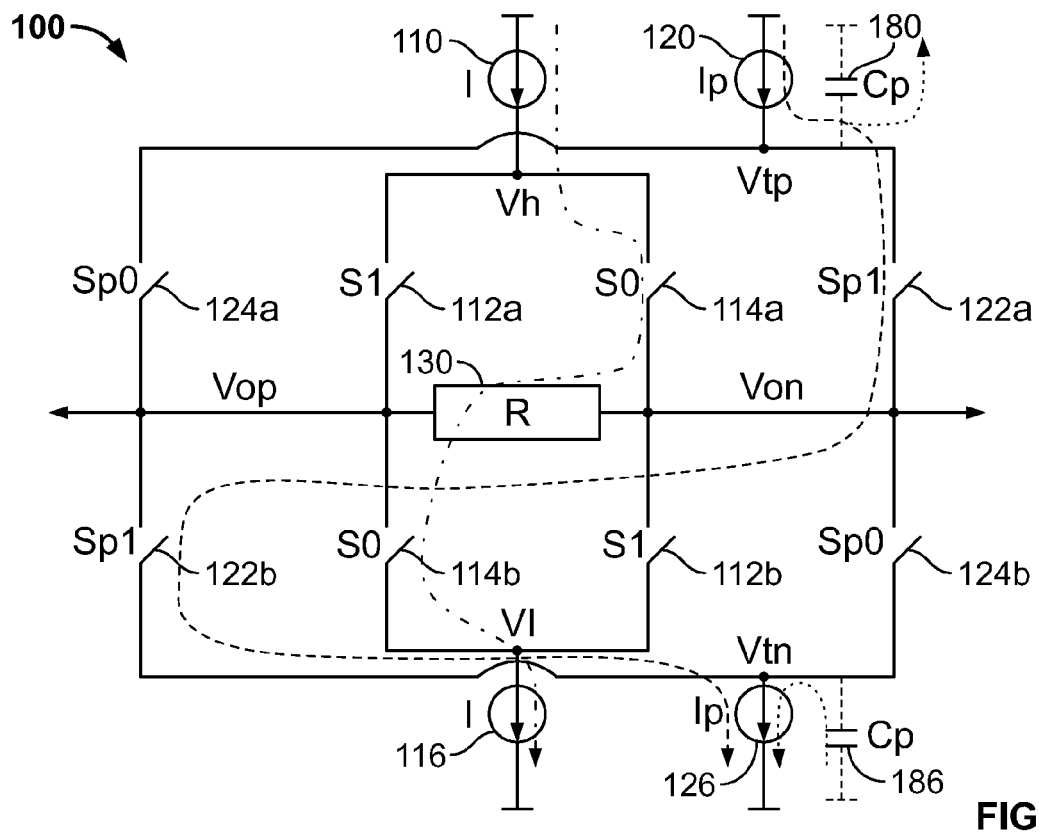
FIG. 10 repeats what is shown in FIG. 6 with additional parasitic circuit features and currents shown.
Figure 11:
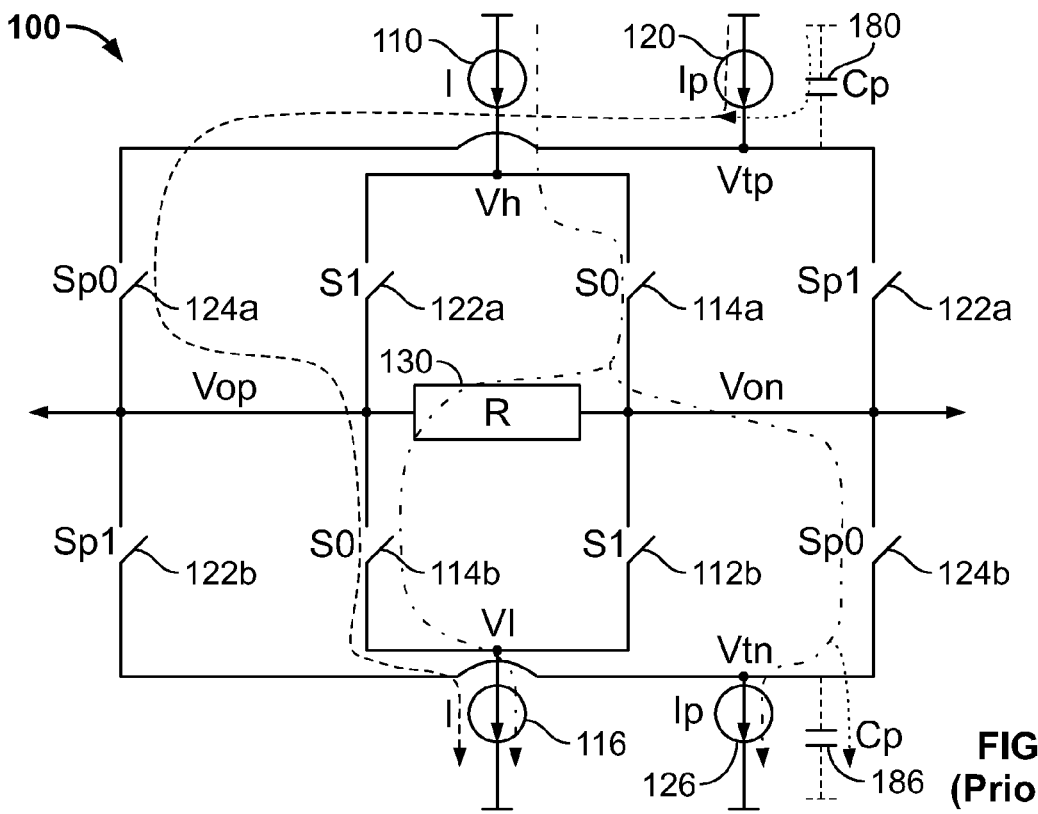
FIG. 11 repeats what is shown in FIG. 8 with additional parasitic circuit features and currents shown.

FIG. 10 shows that when D0 and D1 transit from 11 to 01 (i.e., when D0 changes from 1 to 0, while D1 remains 1 (similar to the condition shown at B in FIG. 7)), Vtp needs to jump from Vl to Vh. This can be seen, for example, by comparing the fact that in FIG. 4 Vtp is connected directly to Vl through closed switches 122a and 112b, while in FIG. 6 Vtp is connected directly to Vh through closed switches 122a and 114a. Vtn also needs a sudden reverse voltage change (i.e., from Vh as in FIG. 4 (switches 112a and 122b closed) to Vl as in FIG. 6 (switches 122b and 114b closed)).

Each of current sources 120 and 126 inevitably has associated with it some parasitic capacitance 180 or 186, respectively. Such parasitic capacitance Cp limits or is deleterious to the above-needed fast transitions of Vtp and Vtn. Part of the current from Ip is needed to discharge Cp. This means that there is less net current flow across resistor R (130), and this in turn leads to weak pre-emphasis ramp up (i.e., the transition or ramp identified by P in FIG. 7 is not in fact as steep or strong as depicted or desired). In sum, there is an adverse performance impact on TX equalization at higher data rates due to the memory effects of (or parasitic capacitance associated with) Vtp and Vtn.

When D0 and D1 transit from 01 to 00 (e.g., as in region C in FIG. 9), Vtp needs to jump from Vh to Vl (compare FIG. 6 (in which Vtp is connected to Vh via closed switches 122a and 114a) to FIG. 8 (in which Vtp is connected to Vl via closed switches 124a and 114b)). Vtn also needs a sudden reverse voltage change from Vl to Vh (again compare FIG. 6 (in which Vtn is connected to Vl via closed switches 122b and 114b) to FIG. 8 (in which Vtn is connected to Vh via closed switches 114a and 124b)). In this case, however, the charging current to the parasitic capacitors Cp (180 and 186) actually helps to reduce the current across R (130). Reduced current across R is what is needed to produce ramp or transition Q in FIG. 9. Therefore in this case the parasitic capacitance Cp does not have an adverse effect on the desired steepness of ramp Q.

In accordance with the present disclosure, TX driver circuitry that can be architecturally like circuitry 100 can be operated in two different modes, depending on whether the data rate (bit rate) of the serial data signal on which the driver circuitry is operating is greater than or less than a predetermined threshold data rate. An example of such a threshold data rate may be 6 Gbps; but it is emphasized that this is only an example, and that this threshold may be greater than 6 Gbps or less than 6 Gbps in other embodiments in accordance with this disclosure. For convenience herein, a "first" of the above-mentioned modes is the mode used when the data rate is greater than the above-mentioned threshold data rate, and a "second" of the above modes is used when the data rate is less than the threshold data rate. The so-called first mode will be shown and described first. Later, the so-called second mode will be shown and described.

Figure 12:
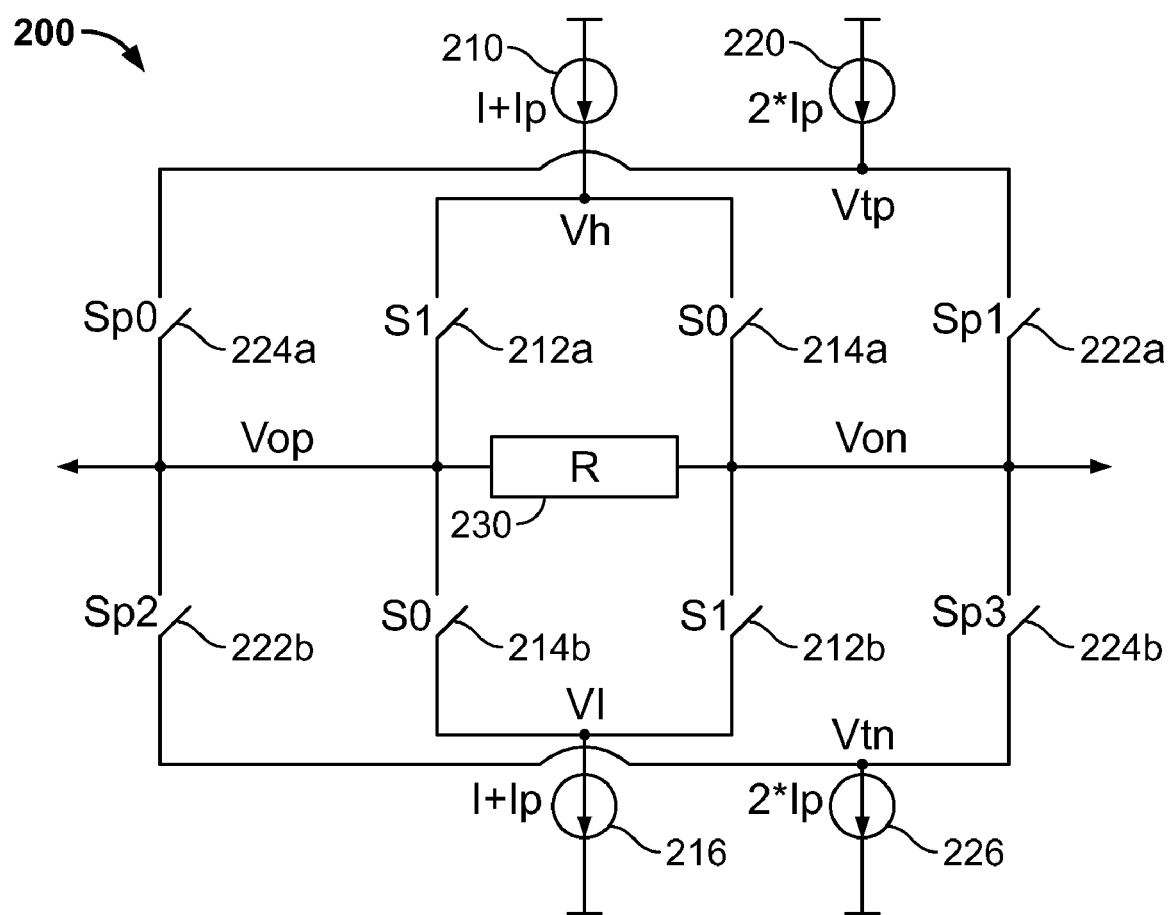
FIG. 12 is similar to FIG. 2, but is for an illustrative embodiment in accordance with certain possible aspects of this disclosure.

FIG. 12 shows an illustrative embodiment of driver circuitry 200 in accordance with this disclosure. The architecture (overall or general circuit arrangement) of driver 200 can be the same as the architecture of driver 100; and as a consequence of this, each element in FIG. 12 has reference number increased by 100 from the reference number of the corresponding element in FIG. 2. Because the architecture of driver 200 is thus the same as the architecture of driver 100, the earlier description of that architecture (in the context of driver 100) applies again to driver 200. It will therefore not be necessary to repeat all of that description here for driver 200. Only operational and control differences will be discussed below.

It will be noted that FIG. 12 shows the electrical current associated with each of current sources 210 and 216 as I+Ip, and the current associated with each of current sources 220 and 226 as 2*Ip. The values of I and Ip can be the same in FIG. 12 as they were in FIG. 2. Driver circuitry 200 can have these current source strengths when operating in the first mode that is now being described. In the later-described second mode, all current source strengths can be the same as in FIG. 2. (Changing current source strengths in this (or any other) way between the first and second modes is optional; but this particular change has the benefit of facilitating discussion herein of comparison between performance of the circuitry in the first and second modes.)

Although it does not affect the basic architecture of circuitry 200 as compared to circuitry 100, it will be noted that post-tap switches 222b and 224b are now labelled Sp2 and Sp3 in FIG. 12. This means that switch 222b can be controlled separately from switch 222a, if desired; and that switch 224b can be controlled separately from switch 224a, if desired. In other words, in driver 200, switches 222a and 222b are no longer necessarily controlled in tandem (as they were in driver 100); and switches 224a and 224b are also no longer necessarily controlled in tandem (as they were in driver 100).

Figure 13:
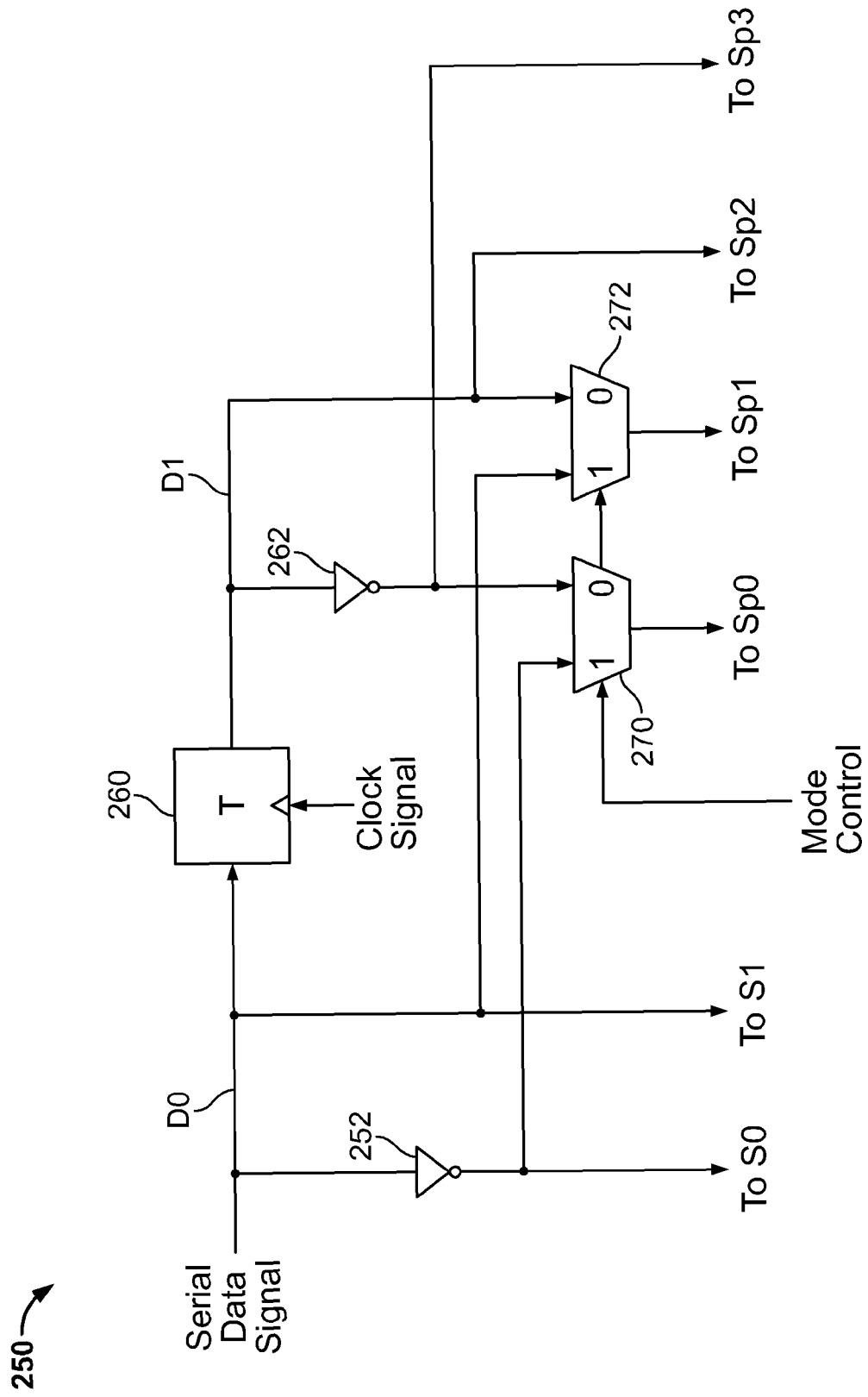
FIG. 13 is a simplified schematic block diagram of an illustrative embodiment of circuitry that can be used with the FIG. 12 circuitry (or with the FIG. 15 circuitry) in accordance with certain possible aspects of the disclosure.

FIG. 13 shows an illustrative embodiment of circuitry 250 for controlling driver 200 based on the serial data signal to be transmitted via driver 200. Circuitry 250 may have some similarities to earlier-described circuitry 150 (FIG. 3), so that (again) an element in FIG. 13 that is similar to an element in FIG. 3 has a reference number that is increased by 100 from the similar-element reference number in FIG. 3. To the extent that there is such element and operational similarity between FIGS. 3 and 13, the earlier description of FIG. 3 will be understood to apply again to FIG. 13, and that description will accordingly not need to be expressly repeated here for FIG. 13. The following will focus mostly on how circuitry 250 differs from circuitry 150.

Circuitry 250 includes the potential for separate control of each of switches Sp0, Sp1, Sp2, and Sp3. In particular, switch Sp0 is controlled by the output signal of multiplexer circuitry ("mux") 270, switch Sp1 is controlled by the output signal of mux 272, switch Sp2 is controlled by the output D1 of delay circuit element 260, and switch Sp3 is controlled by the output signal of inverter circuitry 262 (which produces an output signal that is the logical inverse of the output signal of delay element 260).

Mux 270 has two selectable inputs. One of these selectable inputs is D0 (i.e., the serial data signal that is applied to circuitry 250) after logical inversion by inverter 252. The other selectable input to mux 270 is the output signal of inverter 262. Mux 270 also has a selection control input, i.e., the signal labelled "mode control" in FIG. 13. The binary logical state of this mode control signal determines which of its two selectable inputs mux 270 selects to be its output signal. For example, in the illustrative embodiment being discussed, the mode control signal may be logic 1 in the first mode of operation of the circuitry and logic 0 in the second mode of operation of the circuitry. A selection control signal value of logic 1 causes mux 270 to output the logical inverse of D0. (Conversely, a selection control signal value of logic 0 causes mux 270 to output the output signal of inverter 262.)

Mux 272 also has two selectable inputs, i.e., D0 and D1, respectively. The selection control input signal of mux 272 is the mode control signal again. Thus if mode control is logic 1 (as it is in the first mode currently being discussed), mux 272 selects D0 to be its output signal. (Conversely, if mode control is logic 0, mux 272 selects D1 to be its output signal.)

Figure 14:
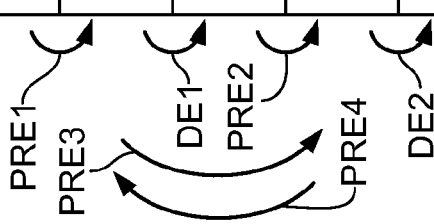
FIG. 14 is a table illustrating various operating conditions of the FIG. 12 circuitry in accordance with certain possible aspects of the disclosure.

FIG. 14 is a table showing how each of switches S0, S1, Sp0, Sp1, Sp2, and Sp3 in FIG. 12 is controlled by circuitry 250 in response to each possible combination of values of D0 and D1 in the currently being described first mode (i.e., when mode control is logic 1). For example, the first line of this table shows that if D0 is 1 and D1 is 1, then circuitry 250 controls circuitry 200 in FIG. 12 to close switches S1, Sp1, and Sp2, and to open switches S0, Sp0, and Sp3. This causes Vout (i.e., the difference between Vop and Von in FIG. 12) to be equal to (I−Ip)*R. The last (right-most) column in the FIG. 14 table indicates whether or not the post-tap portion of driver 200 in FIG. 12 (i.e., elements 220, 222, 224, and 226) is effectively contributing to Vout. Under the conditions specified in the first line in FIG. 14, "yes" in the last column means that the post-tap circuitry is contributing to Vout. This can be seen from the fact that under these conditions switches Sp1 and Sp2 are closed, which means that there is a "completed" circuit path through driver 200 resistor 230 from source 220 to sink 226.

Turning now to a second example, the second line in FIG. 14 shows that if D0 is 0 and D1 is 1, circuitry 250 controls circuitry 200 to close switches S0, Sp0, and Sp2, and to open switches S1, Sp1, and Sp3. Because both of the post-tap switches (Sp0 and Sp2) on one side of resistor 230 in circuitry 200 are closed, the post-tap current (equal to 2*Ip) can and does completely bypass resistor 230 (i.e., this entire post-tap current can flow from source 220 to sink 226 without flowing through the resistor). The post-tap current therefore does not contribute to the resulting value of Vout, which value (−(I+Ip)*R) is solely the result of current in main tap circuit elements 210, 212, 214, and 216. Hence the "no" in the last column in the second line of FIG. 14.

It will be apparent that the condition shown in the second line of FIG. 14 can occur in a UI that immediately follows a UI having the condition shown in the first line in that FIG. Assuming that such a sequence of UIs has occurred, then along its left-hand side FIG. 14 indicates by the arrow PRE1 that moving from the first line in the FIG. 14 table to the second line in that table causes Vout to have what may be referred as a "pre-emphasis transition" or a "pre-emphasis ramp" (e.g., somewhat like transition or ramp P in FIG. 7). Unlike transition P in FIG. 7, however, ramp PRE1 in FIG. 14 occurs substantially without the post-tap portion of driver 200 contributing current to the determination of the end-point Vout value (i.e., −(I+Ip)*R). Transition PRE1 is called a "pre-emphasis" ramp or transition because its end-point Vout includes extra or pre-emphasis distance from a reference voltage like the dashed line reference in FIG. 7. This pre-emphasis voltage distance is "extra" because it is more than the distance from the reference voltage of the more basic levels of Vout (i.e., the level of Vout for any bit that does not immediately follow a bit having a different data value). Note that pre-emphasis in any given direction never lasts for more than one bit or one UI.

The third line if FIG. 14 shows that if D0 and D1 are both 0, circuitry 250 controls circuitry 200 to close switches S0, Sp0, and Sp3, and to open switches S1, Sp1, and Sp2. As compared to the second line in FIG. 14, this third-line condition causes the post-tap current 2*Ip to again flow through resistor 230. However this post-tap current flow through resistor 230 is opposite to the direction of main tap current flow (I+Ip) through the resistor. This causes Vout in line three of FIG. 14 to rise by 2*Ip*R relative to Vout in line two. This comparison assumes that line three represents a UI that immediately follows a line two UI (as is entirely possible). Continuing with this assumption, the arrow DE1 in FIG. 14 indicates what may be referred to as a "de-emphasis transition" or a "de-emphasis ramp" in Vout from line 2 to line 3. (The term "de-emphasis" is used (again) because this is a transition or ramp from a level of Vout that includes extra or pre-emphasis voltage (energy) to a level of Vout that does not include such extra voltage (and has therefore been referred to elsewhere herein as a more "basic" voltage). DE1 is somewhat like transition or ramp Q in FIG. 9.

The fourth line in FIG. 14 shows that if D0 is 1 and D1 is 0, circuitry 250 controls circuitry 200 to close switches S1, Sp1, and Sp3, and to open switches S0, Sp0, and Sp2. The fact that switches Sp1 and Sp3 are both closed means that all of the post-tap current (2*Ip) bypasses resistor 230. In other words, the post-tap circuitry does not contribute significantly to driving Vout to its end-point voltage ((I+Ip)*R) in FIG. 14 line four. Hence the "no" for this line in the right-hand column in this FIG.

Assuming that line four in FIG. 14 occurs in a UI immediately following a line three UI, then the arrow PRE2 in FIG. 14 indicates the occurrence of another "pre-emphasis transition" or "pre-emphasis ramp" in Vout as that voltage transitions from −(I−Ip)*R to (I+Ip)*R. As before, such a "pre-emphasis" ramp or transition is one that ends with Vout including extra or pre-emphasis voltage (in this case greater than the related more "basic" voltage level (I−Ip)*R such as in line one of FIG. 14).

The fifth line in FIG. 14 is a repetition of the first line. If the fifth line were to occur in a UI immediately following the fourth line, then arrow DE2 indicates the occurrence of another "de-emphasis transition" or "de-emphasis ramp" in Vout as that voltage drops back from (I+Ip)*R to (I−Ip)*R. As in earlier-described de-emphasis ramp DE1, this is the result of post-tap current 2*Ip again being switched into use through resistor 230, but with a current flow direction through the resistor opposite to the main tap current flow direction. This results in subtraction of post-tap current 2*Ip from main tap current I+Ip. This produces a decrease in Vout equal to 2*Ip*R from the "pre-emphasis" Vout level of (I+Ip)*R in line four to the related, more basic or "de-emphasis" level of (I−Ip)*R in line five.

Arrow PRE3 in FIG. 14 indicates another possible data sequence that may occur in two successive UIs. This is a transition from line two to line four. Transition PRE3 is another "pre-emphasis transition" or "pre-emphasis ramp" because the end-point value of Vout ((I+Ip)*R) includes extra or pre-emphasis voltage (i.e., voltage that is farther from the 0 volt dashed line reference level in FIG. 5, 7, or 9 than the related, more basic de-emphasis voltage (which is on the same side of the 0 volt line, but somewhat closer to the 0 volt line)). Arrow PRE4 in FIG. 14 indicates yet another possible "pre-emphasis transition" or "pre-emphasis ramp," which is a transition or ramp in the opposite direction from PRE3, but which is otherwise similar to PRE3. Note that the "no" entries in the right-hand column in FIG. 14 indicate that both of ramps PRE3 and PRE4 reach their end-point voltages without any contribution from the post-tap circuitry. The same has already been shown to be true for ramps PRE1 and PRE2. Thus, in accordance with this disclosure, the post-tap portion of circuitry 200 is not used to drive any pre-emphasis transition or ramp. The post-tap portion of circuitry 200 is only used to drive the de-emphasis transitions or ramps like DE1 and DE2.

The overall size (magnitude, absolute value) of pre-emphasis Vout ramps PRE1 is the same as the overall size of pre-emphasis Vout ramps PRE2. Pre-emphasis Vout ramps PRE3 and PRE4 are each greater in overall size (magnitude, absolute value) by 2*Ip*R than PRE1 and PRE2 ramps. The size (magnitude, absolute value) of all DE1 and DE2 ramps is 2*Ip*R.

From the foregoing discussion of the so-called first mode of operation of driver 200 it will be seen that load resistor 230 (R) takes either the main tap current or the difference current between the main tap and the post-tap current. There is no summing current flow via R. The post-tap circuitry is effectively not used to drive any pre-emphasis ramp. This avoids the adverse effect of post-tap circuitry parasitic capacitance on the desired high speed of the pre-emphasis ramps. The post-tap circuitry is only used to drive the de-emphasis ramps, during which the parasitic capacitance of the post-tap circuitry actually helps achieve desired high-speed ramps.

Figure 15:
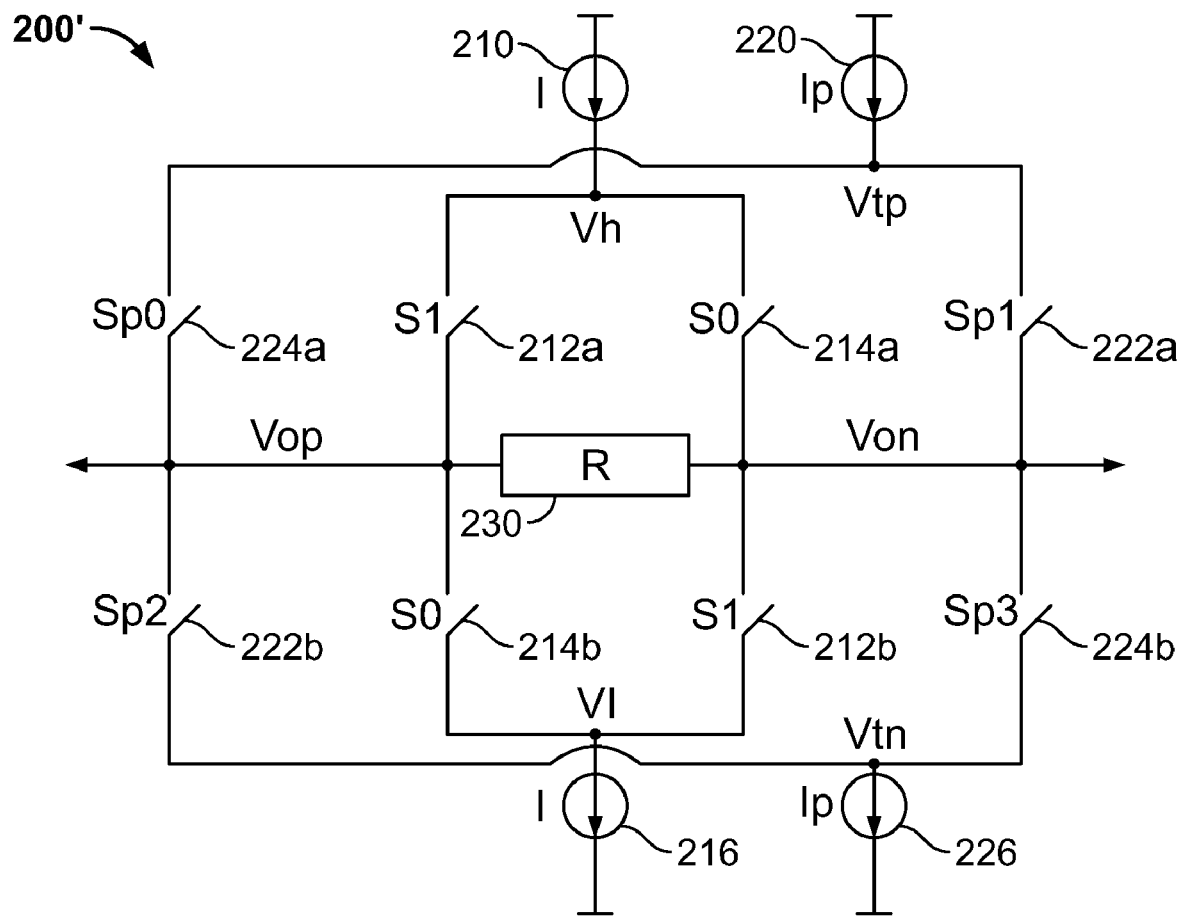
FIG. 15 is similar to FIG. 2, but is for an illustrative embodiment in accordance with certain possible aspects of the disclosure.

We turn now to the second mode of operating driver circuitry 200 (used for serial data signals having lower serial data bit rates). FIG. 15 shows circuitry 200 again, but with different values of current in elements 210, 216, 220, and 226. These different values are the same as in FIG. 2. Because the second mode of operating circuitry 200 is similar to the mode described earlier for the FIG. 2 circuitry, using the FIG. 2 current values in circuitry 200 as shown in FIG. 15 facilitates using FIG. 15 in the following discussion of the second mode of operating circuitry 200. These FIG. 2 and FIG. 15 current values also produce the same values of Vout under all of the same serial data signal conditions as are shown for the first mode of operating circuitry 200 in FIG. 14. These FIG. 2/15 current values therefore also facilitate comparison of the first and second modes of operating circuitry 200. Although the circuitry shown in FIG. 15 is the same as circuitry 200 in FIG. 12, the reference number 200' may sometimes be used for what is shown in FIG. 15 if a distinction needs to be made. On the other hand, it will be understood that the reference number 200 is generic to the FIG. 12 and FIG. 15 circuitry (because it is or can be the same circuitry). It will also be understood that circuitry 250 is preferably used to control circuitry 200 (FIG.

12 or FIG. 15) in either the first mode (FIGS. 12 and 14) of operating circuitry 200 or the second mode (FIGS. 15 and 16) of operating circuitry 200. (As noted earlier, changing the strengths of current sources 210, 216, 220, and 226 (e.g., as between FIGS. 12 and 15) when changing between the first and second operating modes is an optional possibility. If it is desired, it can be done. If it is not desired, the operating mode can be selected and/or changed with no effect on or change in the strengths of the currents sources.)

When it is desired to operate circuitry 200 in the second mode (e.g., for serial data signals with lower bit rates, as compared to the bit rates for which the above-described first mode is typically used), the mode control signal in FIG. 13 is set to logic 0. This causes mux 270 to output the output signal of inverter 262, and it causes mux 272 to output D1. Because switches Sp1 and Sp2 in circuitry 200 thus now receive the same control signal from circuitry 250, selection of the second mode (mode control equals logic 0) causes switches Sp1 and Sp2 to operate in tandem. Similarly, because switches Sp0 and Sp3 now receive the same control signal from circuitry 250, selection of the second mode causes switches Sp0 and Sp3 to operate in tandem. This means that in the second mode, circuitry 200 operates identically to FIG. 2 circuitry 100 as controlled by FIG. 3 circuitry 150.

FIG. 16 is generally similar to FIG. 14, but for operation of circuitry 200 (with current sources as shown in FIG. 15) in the second mode. Each of the pre-emphasis ramps PRE1' through PRE4' in FIG. 16 is generally similar to the correspondingly numbered pre-emphasis ramp PRE1 through PRE4 in FIG. 14. However, in FIG. 16 each pre-emphasis ramp is produced using both the main tap and the post-tap as described more fully above for circuitry 100, whereas in FIG. 14 only the main tap is used for the pre-emphasis ramps. Thus (as has already been explained) for a serial data signal bit rate for which FIG. 14 is used, these pre-emphasis ramps can be faster (steeper, stronger) using the FIG. 14 control protocol than they would be if the FIG. 16 protocol were used instead.

Each of the de-emphasis ramps DE1' and DE2' in FIG. 16 can be generally similar to the correspondingly numbered de-emphasis ramp DE1 and DE2 in FIG. 14.

Figure 17:
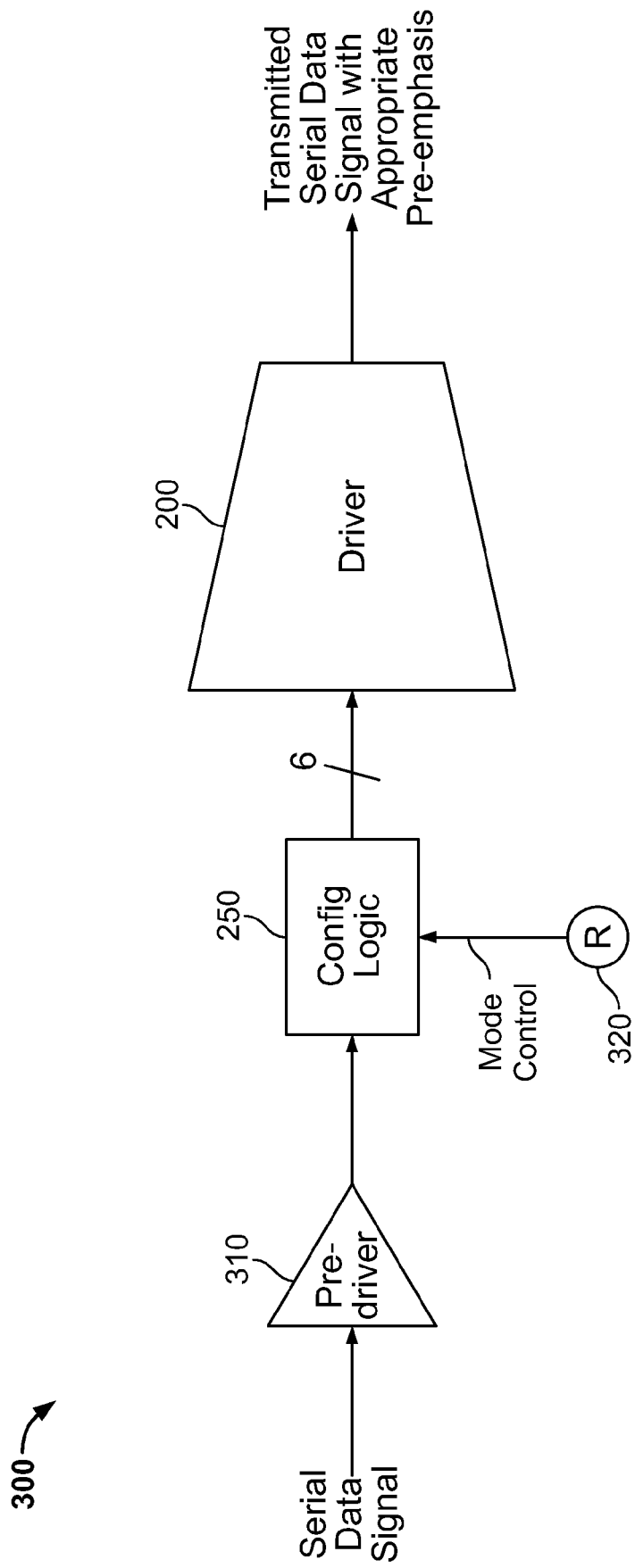
FIG. 17 is a simplified schematic block diagram of an illustrative embodiment of circuitry in accordance with certain possible aspects of the disclosure.

FIG. 17 shows an illustrative embodiment of a larger context on an integrated circuit ("IC") 300 that may include circuitry like 200 and 250 in accordance with this disclosure. Thus, for example, FIG. 17 shows that a serial data signal that is to be driven off IC 300 (e.g., onto a communication channel like 10 in FIG. 1) may be first applied to pre-driver circuitry 310. Circuitry 310 may strengthen and condition the serial data signal for application to configurable logic circuitry 250 (e.g., as in FIG. 13). A programmable memory circuit element 320 on IC 300 produces the above-described mode control signal that is used to determine whether circuitry 250 controls circuitry 200 to operate in the above-described first mode or the above-described second mode. For example, memory element 320 may be a so-called configuration random access memory ("CRAM") element that is programmed to either logic 1 or logic 0 when IC 300 is first being initialized for subsequent "normal mode" or "user mode" operation (e.g., no serial data signal is processed until such initialization has been performed; after such initialization, IC 300 enters its normal mode and can then process a serial data signal).

Circuitry 250 produces the six output signals ("to S1," "to S0," "to Sp0," "to Sp1," "to Sp2," and "to Sp3") shown in FIG. 13 for application to the various switches in driver circuitry 200. These signals are based on the incoming serial data signal in accordance with the mode selected by the mode control signal. Driver 200 responds to these signals from circuitry 250 by outputting the serial data signal with appropriate pre-emphasis.

Figure 18A:
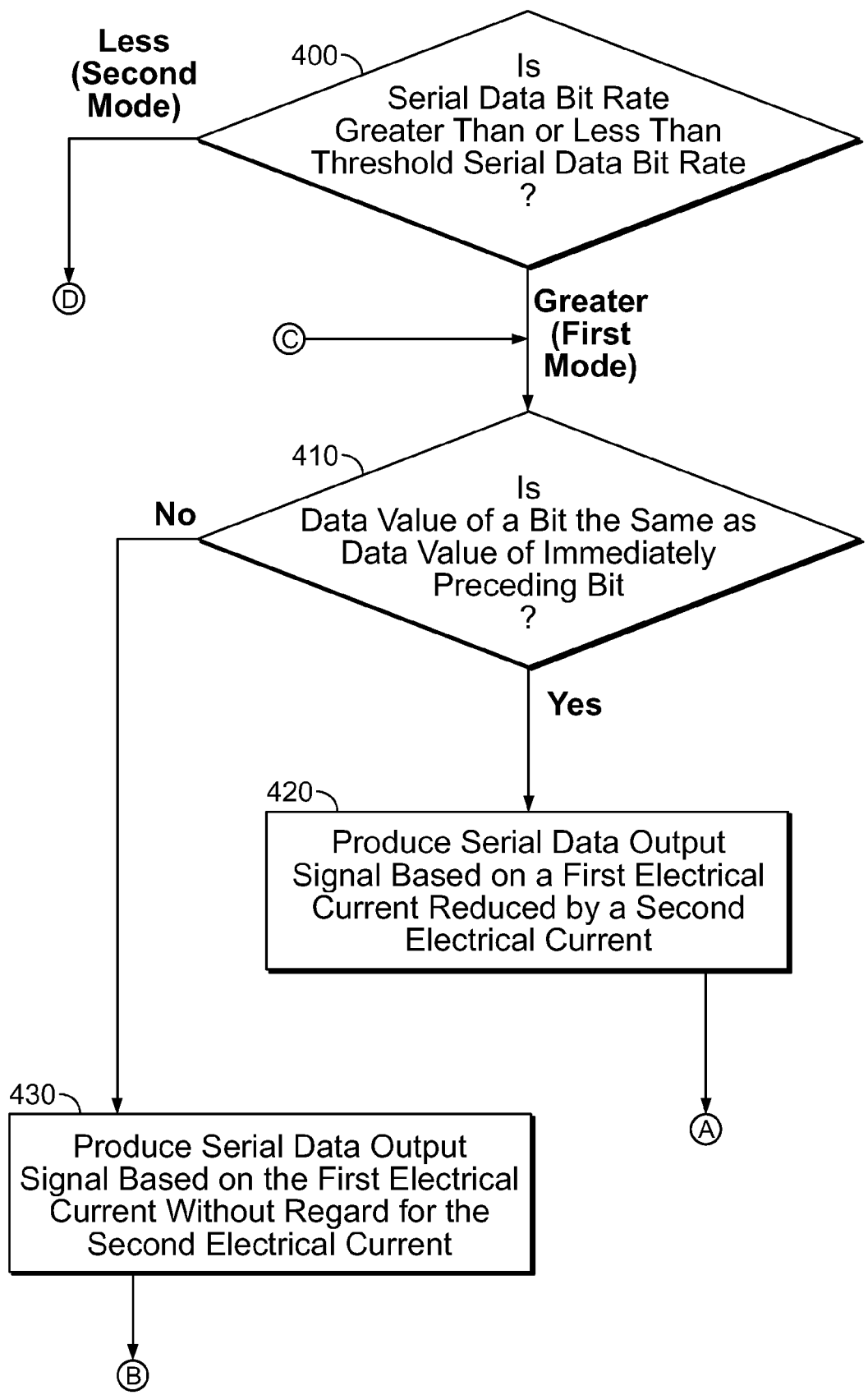
FIGS. 18a-c are collectively a simplified flow diagram of an illustrative embodiment of certain possible method aspects in accordance with the disclosure.
Figure 18B:
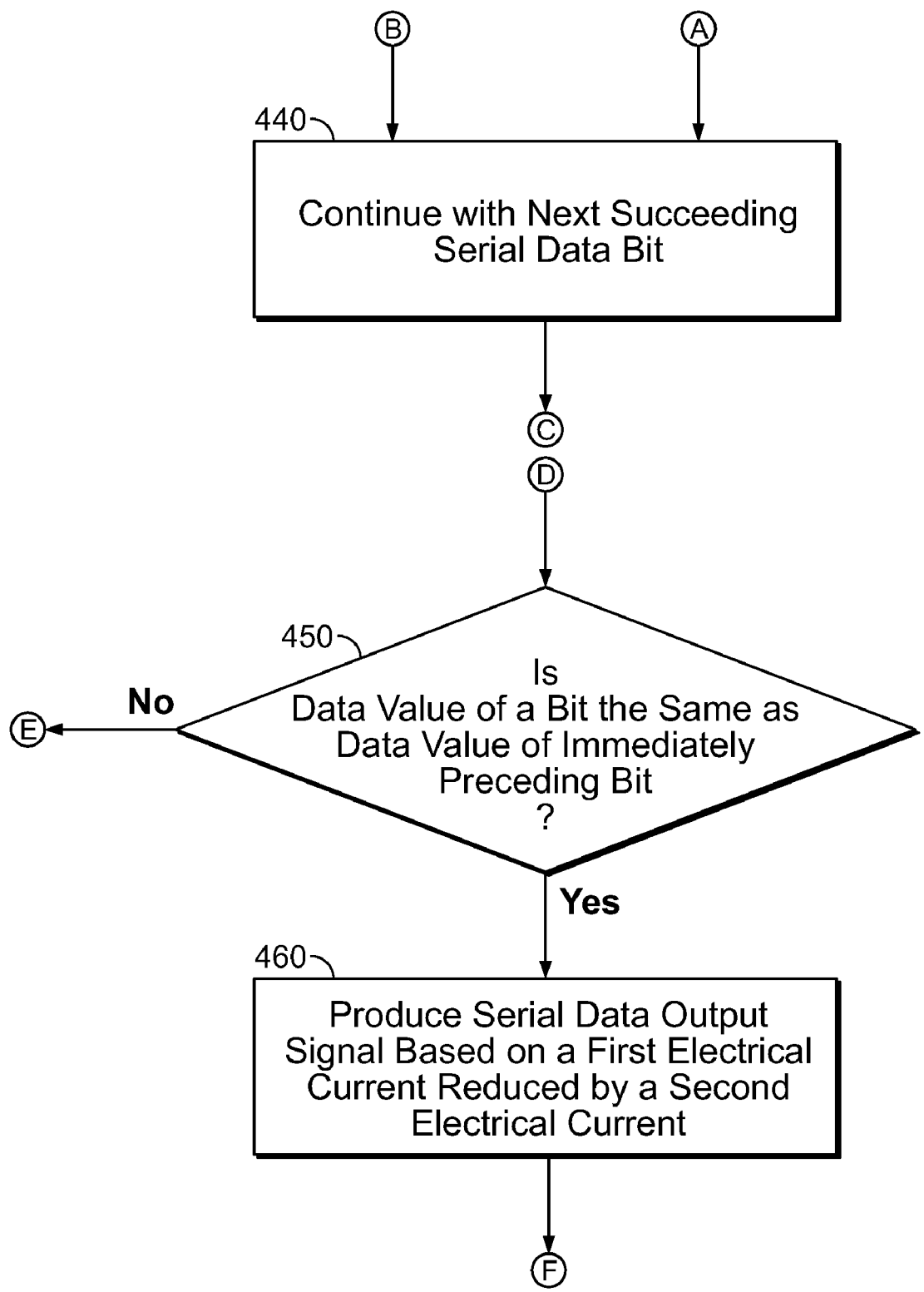
Figure 18C:
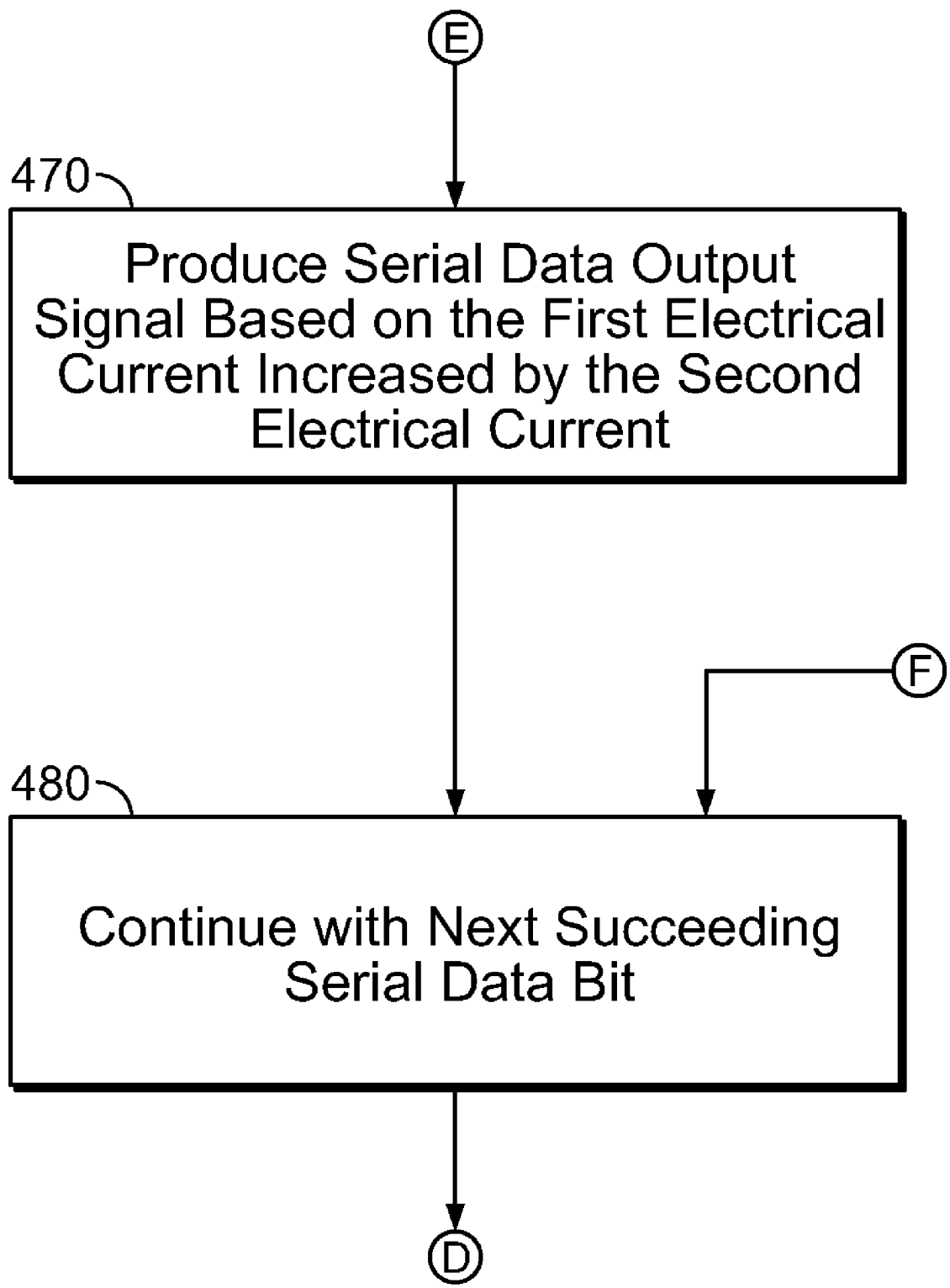

An illustrative embodiment of certain possible method aspects of the disclosure is shown in FIGS. 18a-c (sometimes referred to collectively as FIG. 18). At 400 a determination is made as to whether the bit rate of the serial data signal is greater than or less than a threshold serial data bit rate. If the result of this determination is "less than," then control passes from 400 to 450, which causes continued operations in accordance with the earlier-described "second mode." On the other hand, if the result of this determination is "greater than," then control passes from 400 to 410. This causes continued operations in accordance with the earlier-described "first mode."

At 410 a determination is made as to whether or not the data value of a bit is the same as the data value of the immediately preceding bit. If the result of this determination is "yes," then control passes from 410 to 420. On the other hand, if the result of this determination is "no," control passes from 410 to 430.

At 420 a serial data output signal is produced based on a first electrical current reduced by a second electrical current. Control then passes to 440, and thereafter back to 410 for continued operation on the next succeeding serial data bit.

Alternatively, at 430 the serial data output signal is produced based on the first electrical current without regard for the second electrical current. Control then passes to 440, and thereafter back to 410 for continued operation on the next succeeding serial data bit.

Considering now the "second mode," at 450 a determination is made as to whether or not the data value of a bit is the same as the data value of the immediately preceding bit. If the result of this determination is "yes," then control passes from 450 to 460. On the other hand, if the result of this determination is "no," then control passes from 450 to 470.

At 460 a serial data output signal is produced based on a first electrical current reduced by a second electrical current. Control then passes to 480, and thereafter back to 450 for continued operation on the next succeeding serial data bit.

Alternatively, at 470 the serial data output signal is produced based on the first electrical current increased by the second electrical current. Control then passes to 480, and thereafter back to 450 for continued operation on the next succeeding serial data bit.

Although the invention has thus far been illustratively described for the most part in the context of post-tap circuits, the invention is equally applicable to pre-tap circuits. A post-tap circuit selectively modifies the current output bit based on the immediately preceding (earlier) input bit. A pre-tap circuit selectively modifies the current output bit based on the immediately following (later, succeeding) input bit. The nature of the modifications to the current bit can be basically the same (and can be achieved by basically similar circuitry), whether those modifications are based on a post-tap or a pre-tap; and in accordance with this disclosure, the same principles are employed in either case to avoid summing currents through the resistor (like 230) at high data rates for faster recovery.

Figure 19:
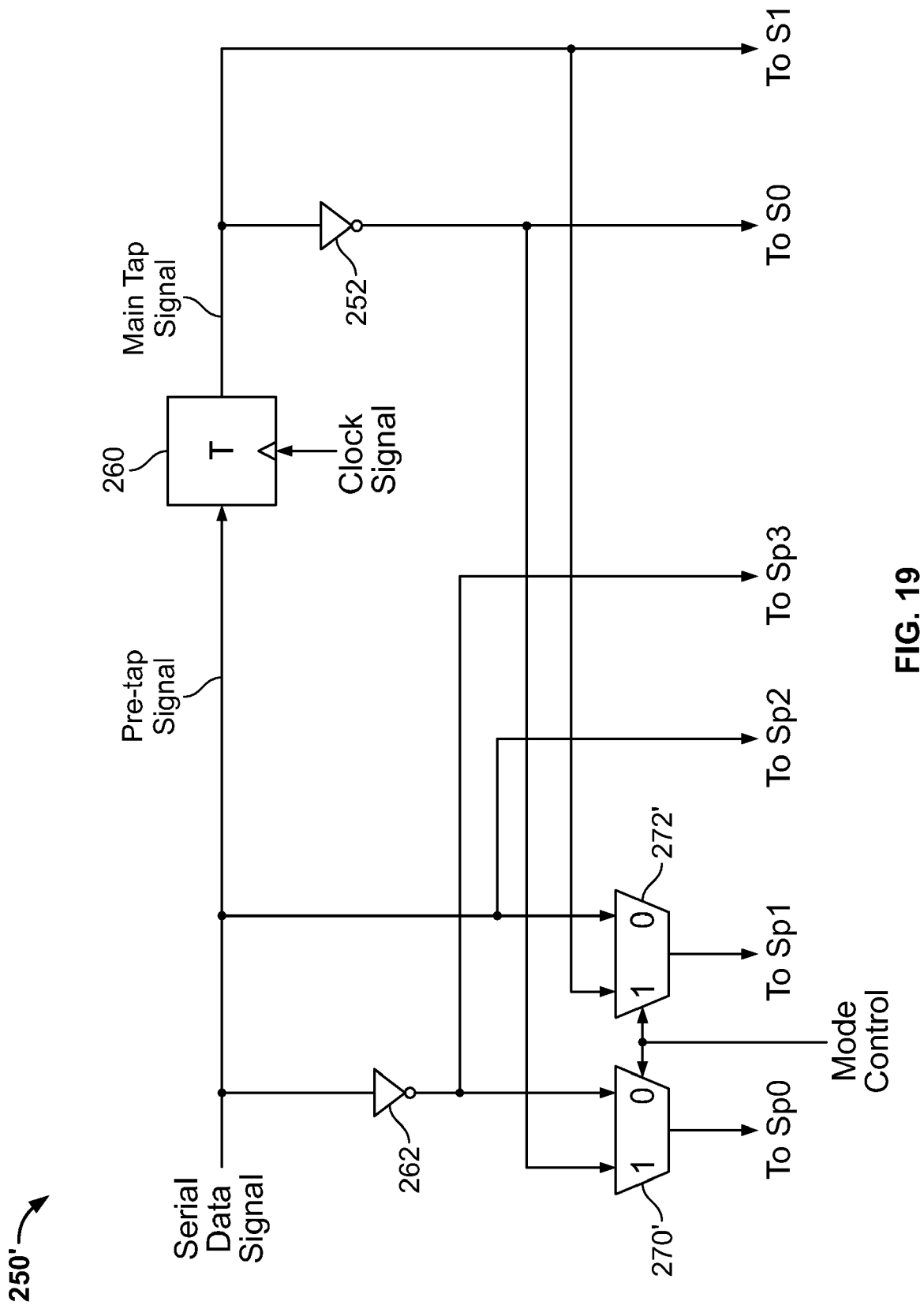
FIG. 19 is generally similar to FIG. 13, but for another illustrative embodiment in accordance with the disclosure.

By way of further illustration of the pre-tap alternative, FIG. 19 shows an exemplary embodiment of circuitry 250' for controlling circuitry 200/200' in the pre-tap case. As shown in FIG. 19, the main tap signal is now the output signal of delay circuit element 260, and the pre-tap signal is the serial data input signal to delay circuit element 260. The main tap switches S0 and S1 in circuitry 200/200' are respectively controlled by the inverted and un-inverted main tap signal (inverter 252 producing the inverted main tap signal). As before, these switches (S0 and S1) control the switching of the larger (main tap) current through resister 230. The switches Sp0, Sp1, Sp2, and Sp3 that control the switching of the smaller pre-emphasis/de-emphasis current through (or at least in relation to) resistor 230 are controlled variously, depending on what "mode" circuitry 250' is operating in. For example, in the high-data-rate "first mode," the mode control signal causes mux 270' to select the inverted main tap signal as its output for controlling switch Sp0. Also in the first mode, the mode control signal causes mux 272' to select the un-inverted main tap signal as its output for controlling switch Sp1. On the other hand, in the low-data-rate "second mode," the mode control signal causes mux 270' to select the inverted pre-tap signal as its output for controlling switch Sp0; and mode control similarly causes mux 272' to select the un-inverted pre-tap signal for controlling switch Sp1. In all cases (i.e., in both the first and second modes) switch Sp2 is controlled by the pre-tap signal, and switch Sp3 is controlled by the inverted pre-tap signal. (The pre-tap signal is inverted by inverter 262.)

It will be seen from this discussion (and earlier discussion herein) that, for purposes of this disclosure, pre-tap circuitry like that shown in FIG. 19 operates similarly to the earlier-described post-tap circuitry. In particular, the following statements are true for both the pre-tap case and the post-tap case: (1) In the low-data-rate "second mode," if two successive bits are different, the currents controlled by them add in resistor 230 in circuitry 200'; but if those two bits are the same, the currents controlled by them subtract in resistor 230 in circuitry 200'. (2) In the high-data-rate "first mode," if two successive bits are different, only the larger main-tap current flows through resistor 230 in circuitry 200 (the smaller post-tap or pre-tap current is diverted away from resistor 230); but if those two bits are the same, then the currents controlled by them subtract in resistor 230 in circuitry 200.

To some extent recapitulating (and in some respects extending) certain aspects of the foregoing, certain aspects of this disclosure relate to circuitry (e.g., 200, 250) for giving pre-emphasis to each bit (e.g., D0) in a serial data signal whose data value differs from a data value of an immediately preceding bit (e.g., D1) in the serial data signal. The circuitry here being recapitulated may include first circuitry (e.g., 210, S0, S1, 216, 252) for causing a first electrical current (e.g., I+Ip) to flow in a circuit element (e.g., 230) in a direction that is indicative of the data value of each succeeding bit. The circuitry here being recapitulated may further include second circuitry (e.g., 220, Sp0, Sp1, Sp2, Sp3, 226, 262, 270, 272), responsive to a condition in which one bit (e.g., D0) has a same data value as the bit (e.g., D1) that immediately preceded said one bit, for causing a second electrical current (e.g., 2*Ip) to flow in the circuit element in a direction opposite to the first current. The circuitry here being recapitulated may still further include third circuitry (e.g., nodes Vop and Von) for producing a serial data output signal (e.g., Vout=Vop−Von) based on amount and direction of net current flow (e.g., (I+Ip)−2*Ip) in the circuit element.

In circuitry as recapitulated above, the above-mentioned circuit element may comprise a resistor (e.g., 230). Further, in circuitry as recapitulated above, the first circuitry may include (1) first current source circuitry (e.g., 210, 216) for providing the first electrical current (e.g., I+Ip); and (2) first switching circuitry (e.g., S0, S1) responsive to the data value of each succeeding bit for directing the first electrical current to flow through the resistor in a first direction when the data value of a bit has a first binary value, and for directing the first electrical current to flow through the resistor in a second direction opposite to the first direction when the data value of a bit has a second binary value. Still further, in circuitry as recapitulated above, the second circuitry may include (1) second current source circuitry (e.g., 220, 226) for providing the second electrical current (e.g., 2*Ip); and (2) second switching circuitry (e.g., Sp0, Sp1, Sp2, Sp3) responsive to the data values of each succeeding bit and each succeeding bit's immediately preceding bit for preventing the second electrical current from flowing through the resistor when the data value of one bit differs from the data value of said one bit's immediately preceding bit (e.g., either both of Sp0 and Sp2 are closed, or both of Sp1 and Sp3 are closed), and for otherwise directing the second electrical current to flow through the resistor in direction opposite to direction of flow of the first electrical current through the resistor (e.g., either both of Sp1 and Sp2 are closed, or both of Sp0 and Sp3 are closed).

In circuitry as recapitulated above, the above-mentioned third circuitry may include output connections (e.g., arrows extending outwardly from Vop and Von) for indicating a voltage difference across the resistor.

Circuitry as recapitulated above may further include optionally usable fourth circuitry (e.g., mux 270 and 272 inputs labelled 0 and selected when mode control is 0), responsive to a condition in which said one bit has a different data value than the bit that immediately preceded said one bit, for causing a third electrical current (e.g., 2*Ip in FIG. 12, or possibly modified to Ip in FIG. 15) to flow in the circuit element (e.g., 230) in a same direction as flow of the first electrical current in the circuit element. Such circuitry may still further include a memory circuit element (e.g., 320) for storing and outputting a mode control signal for controlling whether or not the optionally usable fourth circuitry is used. Alternatively or in addition, such circuitry may further include current source circuitry (e.g., 220, 226) for providing the second electrical current (e.g., 2*Ip in FIG. 12, or possibly modified to Ip in FIG. 15), and the optionally usable fourth circuitry may include switching circuitry (e.g., Sp0, Sp1, Sp2, and Sp3) for routing electrical current from the current source circuitry to produce the third electrical current.

In circuitry as recapitulated above, the above-mentioned first electrical current (e.g., I+Ip) may have magnitude greater than the above-mentioned second electrical current (e.g., 2*Ip).

In certain of its other aspects, the disclosure may relate to a method (e.g., as in FIG. 18) for giving pre-emphasis to each bit (e.g., D0) in a serial data signal whose data value differs from a data value of an immediately preceding bit (e.g., D1) in the serial data signal. In such a method, when one bit has a different data value than the bit that immediately preceded said one bit (e.g., "no" result from 410 in FIG. 18), the method may include (e.g., 430 in FIG. 18) producing a serial data output signal bit (e.g., Vout=Vop−Von) corresponding to said one bit based on a first electrical current (e.g., I+Ip) that is indicative of the data value of said one bit (e.g., flow direction of I+Ip through 230 is indicative of data value of D0) and that is produced without regard for the data value of said bit that immediately preceded said one bit (e.g., other current in system is diverted away from 230). Further in such a method, when said one bit has a same data value as said bit that immediately preceded said one bit (e.g., "yes" result from 410 in FIG. 18), the method may include (e.g., 420 in FIG. 18) producing said serial data output signal bit corresponding to said one bit based on said first electrical current reduced by a second electrical current (e.g., 2*Ip flowing through 230 opposite to the flow direction of I+IP through 230).

In a method as recapitulated above, the second electrical current may have magnitude less than magnitude of the first electrical current. (e.g., 2*Ip is less than I+Ip)

In a method as recapitulated above, the first electrical current (e.g., I+Ip) may be indicative of the data value of said one bit (e.g., D0) by direction of flow of the first electrical current in a circuit element (e.g., 230).

Further in such a method, when said first electrical current (e.g., I+Ip) is reduced by the second electrical current (e.g., 2*Ip), the second electrical current may be made to flow in the circuit element (e.g., 230) in a direction opposite to the direction of flow of the first electrical current in the circuit element.

Recapitulating certain other possible aspects of the disclosure, circuitry (e.g., 200, 200', 250, 250') for giving pre-emphasis to a serial data signal may include first circuitry (e.g., 210, S0, S1, 216; or 220, Sp2, Sp3, 226) responsive to each successive bit (e.g., D0; or pre-tap signal) in the serial data signal for causing a first electrical current flow (e.g., direction of flow of I+Ip through 230; or routing of 2*Ip through either Sp2 or Sp3) indicative of said each successive bit. Circuitry as is here being recapitulated may further include delay circuitry (e.g., 260) for delaying said each successive bit by one unit interval ("UI") to produce a succession of delayed bits (e.g., D1; or main tap signal). Circuitry as is here being recapitulated may still further include second circuitry (e.g., 220, Sp2, Sp3, 226; or 210, S0, S1, 216) responsive to each successive delayed bit for causing a second electrical current flow (e.g., routing of 2*Ip through either Sp2 or Sp3; or direction of flow of I+Ip through 230) indicative of said each successive delayed bit. Circuitry as is here being recapitulated may yet further include circuitry (e.g., Sp0, Sp1) for making a selection between (1) combining (e.g., in 230) and (2) not combining (e.g., preventing one of the first and second currents from flowing through 230) the first and second current flows such that when the current flows are combined, successive bits in a serial data output signal (e.g., Vout=Vop−Vin) are based on the combined current flows (e.g., in 230), and when the current flows are not combined, successive bits in the serial data output signal are based on only one of the first and second current flows (e.g., in 230).

In circuitry as is here being recapitulated, the circuitry for making a selection may be responsive to a data value of said each successive bit and a data value of a concurrent delayed bit (e.g., Sp0, Sp1, Sp2, and Sp3 are variously responsive to D0 and D1; or Sp0, Sp1, Sp2, and Sp3 are variously responsive to pre-tap signal and main tap signal) such that when said data values have a same binary value, the circuitry for selecting selects combining the first and second current flows (e.g., in 230), and when said data values have different binary values, the circuitry for selecting selects not combining the first and second current flows (e.g., one of those current flows is allowed to flow through 230, but the other of those current flows is prevented from flowing through 230).

In circuitry as is here being recapitulated, the combining may be subtraction of one of the first and second current flows from the other of the first and second current flows (e.g., I+Ip flows in one direction through 230, while 2*Ip flows in the opposite direction through 230, which results in subtraction of one of these currents from the other).

In circuitry as is here being recapitulated, one of the first and second current flows may be greater than the other of the first and second current flows (e.g., I+Ip is greater than 2*Ip).

In circuitry as is here being recapitulated, the one of the first and second current flows on which successive bits in the serial data output signal are based when the current flows are not combined may be greater than the other of the first and second current flows (e.g., I+Ip is greater than 2*Ip).

Circuitry as is here being recapitulated may further include optionally usable circuitry (e.g., mux 270, 270', 272, 272' inputs labelled 0 and selected when mode control is 0) for modifying operation of the circuitry for making a selection so that the circuitry for making a selection always selects combining (e.g., mode control equals 0 causes Sp0 to always operate in tandem with Sp3, and Sp1 to always operate in tandem with Sp2). In such circuitry, when the optionally usable circuitry causes the circuitry for making a selection to always select combining, the combining may add the first and second current flows when a bit in the serial data signal has a different data value than a concurrent delayed bit (e.g., I+Ip is added to 2*Ip in 230, or if the current sources are modified as in FIG. 15, I is added to Ip in 230), and the combining otherwise may subtract the first and second current flows from one another (e.g., I+Ip is subtracted from 2*Ip in 230, or if the current sources are modified as in FIG. 15, I is subtracted from Ip in 230). Alternatively or in addition, such circuitry may further include a memory circuit element (e.g., 320) for storing and outputting a mode control signal for controlling whether or not the optionally usable circuitry is used.

Recapitulating certain yet other possible aspects of the disclosure, circuitry for transmitting a serial data signal may include circuitry for giving de-emphasis to a bit that has a same data value as an immediately preceding bit. This may refer, for example, to circuitry that causes Vout transitions like DE1 and DE2 in FIG. 14 and like DE1' and DE2' in FIG. 16. In this case "de-emphasis" refers to a decrease in the absolute value of Vout from (1) the value Vout had for a bit (D0) when that bit differed from the immediately preceding bit, to (2) the value that Vout has when bit D0 becomes bit D1 and the next bit D0 has the same data value as bit D1. The circuitry being here recapitulated may further include circuitry for selectively giving pre-emphasis to a bit that has a different data value than an immediately preceding bit. This may refer, for example, to circuitry that causes Vout transitions like PRE1', PRE2', PRE3', and PRE4' in FIG. 16. In this case "pre-emphasis" refers to the fact that the resulting absolute value of Vout is increased by addition of currents (e.g., I and Ip) that are respectively controlled by a bit (e.g., D0) and its immediately preceding bit (e.g., D1). The circuitry being here recapitulated may further include circuitry for enabling the circuitry for selectively giving pre-emphasis only when the serial data signal has a bit rate that is less than a threshold bit rate. This may refer, for example, to the circuit elements controlled by the mode control signal, which switch off the kind of pre-emphasis mentioned in this paragraph when the bit rate exceeds the threshold bit rate and the mode control signal is accordingly set to logic 1.

Recapitulating certain still other possible aspects of the disclosure, circuitry for transmitting a serial data signal may include circuitry for transmitting selected bits in the serial data signal with de-emphasis. This may refer, for example, to circuitry that causes Vout transitions like DE1 and DE2 in FIG. 14 and like DE1' and DE2' in FIG. 16. (See also the corresponding portion of the immediately preceding paragraph for additional discussion.) The circuitry as is being recapitulated in this paragraph may further include circuitry for selectively transmitting selected bits in the serial data signal with pre-emphasis. This may refer, for example, to circuitry that causes Vout transitions like PRE1', PRE2', PRE3', and PRE4' in FIG. 16. (See also the corresponding portion of the immediately preceding paragraph for additional discussion.) The circuitry as is being recapitulated in this paragraph may still further include circuitry for enabling the circuitry for selectively transmitting only when the serial data signal has a bit rate that is less than a threshold bit rate. This may refer, for example, to the circuit elements controlled by the mode control signal. (See also the corresponding portion of the immediately preceding paragraph for additional discussion.)

It will be understood that the foregoing is only illustrative of the principles of the disclosure, and that various modifications can be made by those skilled in the art without departing from the scope and spirit of the disclosure. For example, the particular control logic shown in FIG. 13 or FIG. 19 is only illustrative, and other circuitry that is basically logically equivalent to what is shown in FIG. 13 or FIG. 19 can be used instead if desired.

What is claimed is:

1. Circuitry for giving pre-emphasis to each bit in a serial data signal whose data value differs from a data value of an immediately preceding bit in the serial data signal comprising:
   first circuitry for causing a first electrical current to flow in a circuit element in a direction that is indicative of the data value of each succeeding bit;
   second circuitry, responsive to a condition in which one bit has a same data value as the bit that immediately preceded said one bit, for causing a second electrical current to flow in the circuit element in a direction opposite to the first current; and
   third circuitry for producing a serial data output signal based on amount and direction of net current flow in the circuit element.

2. The circuitry defined in claim 1 wherein the circuit element comprises a resistor.

3. The circuitry defined in claim 2 wherein the first circuitry comprises:
   first current source circuitry for providing the first electrical current; and
   first switching circuitry responsive to the data value of each succeeding bit for directing the first electrical current to flow through the resistor in a first direction when the data value of a bit has a first binary value, and for directing the first electrical current to flow through the resistor in a second direction opposite to the first direction when the data value of a bit has a second binary value.

4. The circuitry defined in claim 3 wherein the second circuitry comprises:
   second current source circuitry for providing the second electrical current; and
   second switching circuitry responsive to the data values of each succeeding bit and each succeeding bit's immediately preceding bit for preventing the second electrical current from flowing through the resistor when the data value of one bit differs from the data value of said one bit's immediately preceding bit, and for otherwise directing the second electrical current to flow through the resistor in direction opposite to direction of flow of the first electrical current through the resistor.

5. The circuitry defined in claim 4 wherein the third circuitry comprises:
   output connections for indicating a voltage difference across the resistor.

6. The circuitry defined in claim 1 further comprising:
   optionally usable fourth circuitry, responsive to a condition in which said one bit has a different data value than the bit that immediately preceded said one bit, for causing a third electrical current to flow in the circuit element in a same direction as flow of the first electrical current in the circuit element.

7. The circuitry defined in claim 6 further comprising:
   a memory circuit element for storing and outputting a mode control signal for controlling whether or not the optionally usable fourth circuitry is used.

8. The circuitry defined in claim 6 further comprising:
   current source circuitry for providing the second electrical current, and wherein the optionally usable fourth circuitry comprises:
   switching circuitry for routing electrical current from the current source circuitry to produce the third electrical current.

9. The circuitry defined in claim 1 wherein the first electrical current has magnitude greater than the second electrical current.

10. A method for giving pre-emphasis to each bit in a serial data signal whose data value differs from a data value of an immediately preceding bit in the serial data signal comprising:
    when one bit has a different data value than the bit that immediately preceded said one bit, producing a serial data output signal bit corresponding to said one bit based on a first electrical current that is indicative of the data value of said one bit and that is produced without regard for the data value of said bit that immediately preceded said one bit; and
    when said one bit has a same data value as said bit that immediately preceded said one bit, producing said serial data output signal bit corresponding to said one bit based on said first electrical current reduced by a second electrical current.

11. The method defined in claim 10 wherein the second electrical current has magnitude less than magnitude of the first electrical current.

12. The method defined in claim 10 wherein the first electrical current is indicative of the data value of said one bit by direction of flow of the first electrical current in a circuit element.

13. The method defined in claim 12 wherein when said first electrical current is reduced by the second electrical current, the second electrical current is made to flow in the circuit element in a direction opposite to the direction of flow of the first electrical current in the circuit element.

14. Circuitry for giving pre-emphasis to a serial data signal comprising:
    first circuitry responsive to each successive bit in the serial data signal for causing a first electrical current flow indicative of said each successive bit;
    delay circuitry for delaying said each successive bit by one unit interval ("UI") to produce a succession of delayed bits;
    second circuitry responsive to each successive delayed bit for causing a second electrical current flow indicative of said each successive delayed bit; and
    circuitry for making a selection between (1) combining and (2) not combining the first and second current flows such that when the current flows are combined, successive bits in a serial data output signal are based on the combined current flows, and when the current flows are not combined, successive bits in the serial data output signal are based on only one of the first and second current flows.

15. The circuitry defined in claim 14 wherein the circuitry for making a selection is responsive to a data value of said each successive bit and a data value of a concurrent delayed bit such that when said data values have a same binary value, the circuitry for selecting selects combining the first and second current flows, and when said data values have different binary values, the circuitry for selecting selects not combining the first and second current flows.

16. The circuitry defined in claim 14 wherein the combining is subtraction of one of the first and second current flows from the other of the first and second current flows.

17. The circuitry defined in claim 14 wherein one of the first and second current flows is greater than the other of the first and second current flows.

18. The circuitry defined in claim 14 wherein the one of the first and second current flows on which successive bits in the serial data output signal are based when the current flows are not combined is greater than the other of the first and second current flows.

19. The circuitry defined in claim 14 further comprising:
optionally usable circuitry for modifying operation of the circuitry for making a selection so that the circuitry for making a selection always selects combining.

20. The circuitry defined in claim 19 wherein, when the optionally usable circuitry causes the circuitry for making a selection to always select combining, the combining adds the first and second current flows when a bit in the serial data signal has a different data value than a concurrent delayed bit, and the combining otherwise subtracts the first and second current flows from one another.

21. The circuitry defined in claim 19 further comprising:
a memory circuit element for storing and outputting a mode control signal for controlling whether or not the optionally usable circuitry is used.

22. Circuitry for transmitting a serial data signal comprising:
circuitry for giving de-emphasis to a bit that has a same data value as an immediately preceding bit;
circuitry for selectively giving pre-emphasis to a bit that has a different data value than an immediately preceding bit; and
circuitry for enabling the circuitry for selectively giving pre-emphasis only when the serial data signal has a bit rate that is less than a threshold bit rate.

23. The circuitry defined in claim 22 wherein the circuitry for giving de-emphasis comprises:
circuitry for routing first and second electrical currents that are respectively indicative of the data values of the bit and the immediately preceding bit so that the first and second currents subtract from one another when the bit and the immediately preceding bit have the same data value.

24. The circuitry defined in claim 22 wherein the circuitry for selectively giving pre-emphasis comprises:
circuitry for routing first and second electrical currents that are respectively indicative of the data values of the bit and the immediately preceding bit so that the first and second currents add to one another when the bit and the immediately preceding bit have different data values.

25. The circuitry defined in claim 22 wherein the circuitry for enabling comprises:
a circuit element that is programmable to indicate when the serial data rate has a bit rate that is less than the threshold bit rate.

26. Circuitry for transmitting a serial data signal comprising:
circuitry for transmitting selected bits in the serial data signal with de-emphasis;
circuitry for selectively transmitting selected bits in the serial data signal with pre-emphasis; and
circuitry for enabling the circuitry for selectively transmitting only when the serial data signal has a bit rate that is less than a threshold bit rate.

27. The circuitry defined in claim 26 wherein the circuitry for transmitting selected bits in the serial data signal with de-emphasis operates on a bit having a same data value as an immediately preceding bit.

28. The circuitry defined in claim 26 wherein the circuitry for selectively transmitting selected bits in the serial data signal with pre-emphasis operates on a bit having a different data value than an immediately preceding bit.

29. The circuitry defined in claim 27 wherein the circuitry for transmitting selected bits in the serial data signal with de-emphasis operates by subtracting first and second electrical currents that are respectively indicative of the data values of the bit and the immediately preceding bit.

30. The circuitry defined in claim 28 wherein the circuitry for selectively transmitting selected bits in the serial data signal with pre-emphasis operates by adding first and second electrical currents that are respectively indicative of the data values of the bit and the immediately preceding bit.

* * * * *